US011901936B1

(12) United States Patent
Hecht et al.

(10) Patent No.: US 11,901,936 B1
(45) Date of Patent: Feb. 13, 2024

(54) OPTICAL COMMUNICATION NETWORK CONFIGURATION

(71) Applicant: ECI Telecom Ltd., Petah Tikva (IL)

(72) Inventors: Inbal Hecht, Petah Tikva (IL); Efraim Gelman, Ramat Gan (IL); Shirel Ezra, Ganei Tal (IL); Ziv Shem-Tov, Ramat Hasharon (IL); Hayim Porat, Rishon LeTsyion (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 18/353,749

(22) Filed: Jul. 17, 2023

Related U.S. Application Data

(60) Provisional application No. 63/479,388, filed on Jan. 11, 2023.

(51) Int. Cl.
*H04B 10/038* (2013.01)
*H04B 10/27* (2013.01)

(52) U.S. Cl.
CPC ........... *H04B 10/038* (2013.01); *H04B 10/27* (2013.01)

(58) Field of Classification Search
CPC ............. H04B 10/038; H04B 10/27; H04Q 2011/0081; H04L 45/02; H04L 45/123; H04L 45/22; H04L 45/28
See application file for complete search history.

(56) References Cited

U.S. PATENT DOCUMENTS

| 10,498,590 | B1 * | 12/2019 | Ezra | .................... H04L 45/1287 |
| 10,841,003 | B1 * | 11/2020 | Ezra | ....................... H04L 45/02 |
| 10,903,904 | B1 * | 1/2021 | Ezra | ....................... H04B 10/25 |
| 10,958,562 | B1 * | 3/2021 | Ezra | ....................... H04L 45/02 |
| 11,025,533 | B1 * | 6/2021 | Ezra | ....................... H04B 10/03 |
| 2023/0083172 | A1 * | 3/2023 | Alaettinoglu | ...... H04B 10/0793 |

FOREIGN PATENT DOCUMENTS

CN 108377220 A * 8/2018 ............ H04L 45/02

* cited by examiner

*Primary Examiner* — Pranesh K Barua
(74) *Attorney, Agent, or Firm* — Finnegan, Henderson, Farabow, Garrett & Dunner LLP

(57) ABSTRACT

A network management system can be configured to identify routes for satisfying a set of demands on an optical communication network using layer graph(s). The layer graph edges can have edge scores that indicate a cost of the edge. The network management system can generate the layer graph(s) using a network graph that represents the optical communication network and an associated sets of available frequency slots. The network management system can iteratively identify candidate path(s) on the layer graph(s) that correspond to each of the demands and determine a cost for each candidate path using the edge scores. In each iteration, the network management system can select the lowest cost candidate path, update the layer graph(s) based on this selection, and update the candidate paths for the remaining demands as needed. The network management system can similarly generate restoration paths for each of the demands.

22 Claims, 11 Drawing Sheets

OPTICAL COMMUNICATION NETWORK CONFIGURATION

CROSS-REFERENCE TO RELATED APPLICATION

The present application claims priority to U.S. Provisional App. No. 63/479,388, filed on Jan. 11, 2023, which is hereby incorporated by reference in its entirety.

TECHNICAL FIELD

The present disclosure relates to the field of communication networks and, more particularly, to systems and methods for routing in communication networks.

BACKGROUND

An optical communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network. Determining routes on a communications network that satisfy a set of demands is an NP-hard problem. Because this problem is NP-hard, determining an optimal assignment of paths, for some optimality criterion, becomes intractable as the size of the communication network or number of demands increases.

SUMMARY

Systems and methods are disclosed for configuring an optical communication network to satisfy a set of demands. A network management system can generate layer graph(s) using a network graph that represents the communication network. A cost function can be used to assign edge scores to the layer graph edges. The network management system can select paths on the layer graphs based on the layer graph edge scores. The network management system can configure the network to satisfy the demands using routes in the communication network corresponding to the selected paths.

The disclosed embodiments include a method for configuring an optical communication network associated with a set of frequency slots. The method can include operations. The operations can include obtaining a network graph corresponding to the communication network. The network graph can include network graph vertices corresponding to nodes of the communication network. The network graph can include network graph edges corresponding to links of the communication network. Each network graph edge can be associated with an available subset of the set of frequency slots. The operations can include obtaining demands having source and terminal nodes on the communication network. The operations can include selecting, from among the obtained demands, demands associated with a frequency slot width. The operations can include obtaining layer graphs corresponding to a first subset of the set of frequency slots of the selected frequency slot width. A first layer graph of the layer graphs can correspond to a first frequency slot of the first subset. The first layer graph can include layer graph edges corresponding to the network graph edges that include, in the available subsets, the first frequency slot, and layer graph vertices corresponding to the network graph vertices connected by the network graph edges that include, in the available subsets, the first frequency slot. The operations can include determining, using the layer graphs, paths for the selected demands on the communication network. The determination of a first path for a first demand of the selected demands can include determining candidate paths for the selected demands. Each candidate path for the first demand can connect a first layer source vertex of the layer graphs to a first layer terminal vertex of the layer graphs. The first layer source vertex can correspond to a first source node of the communication network for the first demand. The first layer terminal vertex can correspond to a first terminal node of the communication network for the first demand. The determination of a first path for a first demand of the selected demands can include selecting a first candidate path of the candidate paths as the first path for the first demand. The operations can include configuring the communication network to satisfy the selected demands using the determined paths for the selected demands.

The disclosed embodiments include another method for configuring an optical communication network associated with a set of frequency slots. The method can include operations. The operations can include identifying a first failure condition for the communication network. The operations can include obtaining a valid network graph corresponding to the communication network when the communication network experiences the first failure condition. The valid network graph can include network graph vertices corresponding to operational nodes of the communication network when the communication network experiences the first failure condition. The valid network graph can include network graph edges corresponding to operational links of the communication network when the communication network experiences the first failure condition. Each network graph edge can be associated with an available subset of the set of frequency slots. The operations can include identifying demands on the communication network that are unsatisfied when the communication network experiences the first failure condition. The operations can include determining restoration paths for the demands. Determining restoration paths can include obtaining sets of layer graphs, a first set of the layer graphs corresponding to the valid network graph and a first demand of the demands. Determining restoration paths can further include determining candidate paths for the demands on the sets of the layer graphs. A first candidate path can be for the first demand and can connect a first layer source vertex of the first set of the layer graphs to a first layer terminal vertex of the first set of the layer graphs. The first layer source vertex can correspond to a first source node of the communication network for the first demand. The first layer terminal vertex can correspond to a first terminal node of the communication network for the first demand. Determining restoration paths can further include selecting the first candidate path as a first restoration path for the first demand. The operations can further include configuring the communication network to use the restoration paths to satisfy the demands when the communication network experiences the first failure condition.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
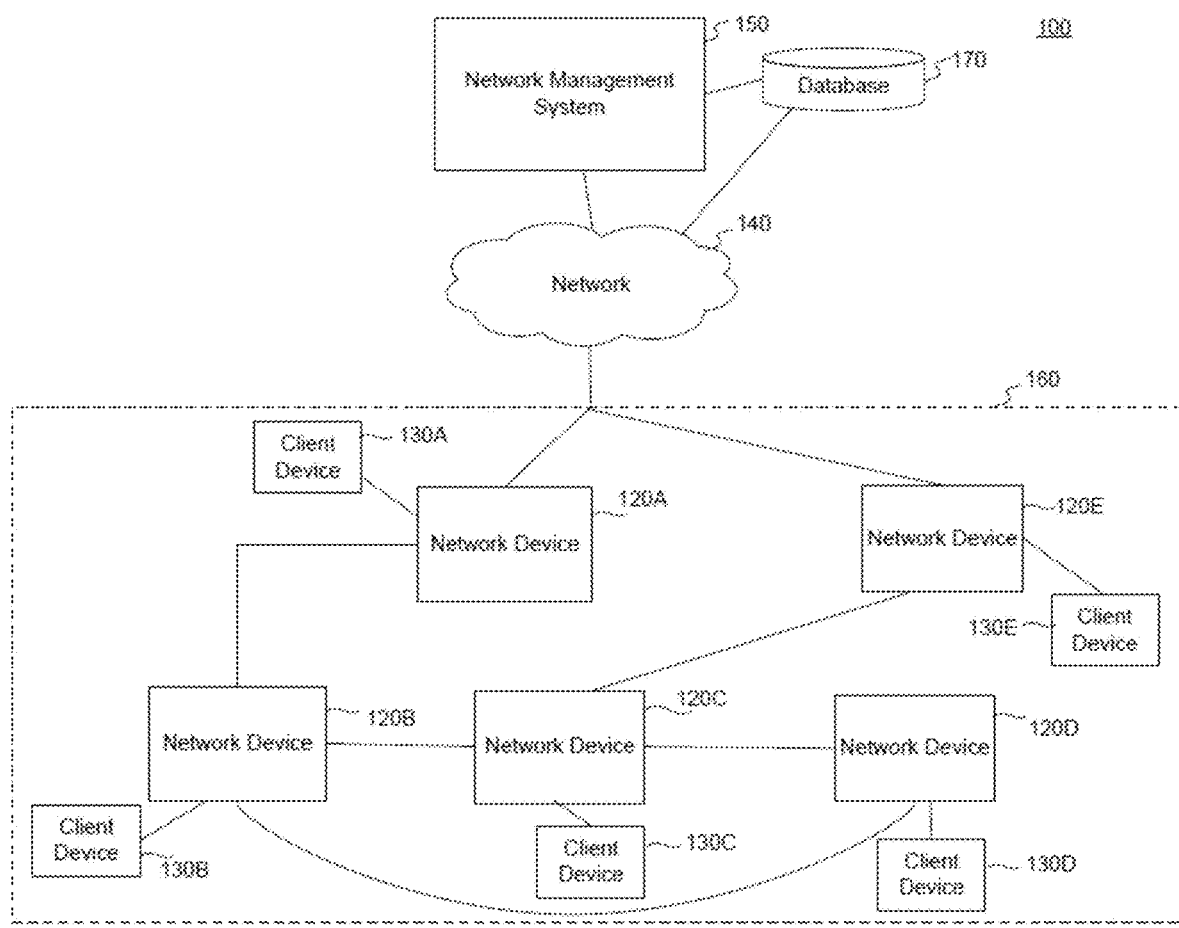
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The disclosed embodiments can be performed using a graph representing the communication network. The graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Determining routes on a communications network that satisfy a set of demands is an NP-hard, technical problem. Because this problem is NP-hard, determining an optimal assignment of paths, for some optimality criterion, becomes intractable as the size of the optical communication network or number of demands increases. Multiple potential routes can exist between a source node and target node of a demand on the communication network. These routes may use different frequency slots (or diffing combinations of frequency slots) and pass through different sets of intermediate nodes on the communications network. Furthermore, potential routes for different demands can conflict. For example, assigning a demand to a frequency slot on a particular communication link can prevent other demands from using that communication link. In addition, a conflict that prevents a demand from using a frequency slot on one communication link on a route can prevent the demand from using that frequency slot on all communications links on that route, as the demand may preferentially use a single frequency slot for the entire route.

An optimal assignment of routes to demands can be approximated by iteratively selecting the lowest cost path in a set of candidate paths, according to some cost function. If necessary, the unselected candidate paths can be updated or new candidate paths determined based on the selection of the lowest cost candidate path. The selection process can continue until each demand is assigned a route or no suitable routes exist for the remaining demands. A cost function can be selected or adapted to emphasize sets of paths having certain characteristics.

A set of paths (or candidate paths, or restoration paths, or routes, or the like) can include one or more paths (or candidate paths, or restoration paths, or routes, or the like).

In some embodiments, the cost function can encourage the selection of paths for demands having node, edge, or shared risk link diversity. As may be appreciated, encouraging node, edge, or shared risk link diversity can reduce the number of demands affected by a single node, edge or SRLG failure, thereby improving the resilience of the communication network.

In some embodiments, the cost function can assign costs to paths based at least in part on characteristics of the communications links corresponding to the layer graph edges included in the paths. Such characteristics can include bandwidth or free bandwidth, cost, physical length, delay or latency, network slice, or the like. For example, the bandwidth or free bandwidth of a communication link can affect the priority of the communication link. In some embodiments, the cost function can assign costs to paths based at least in part on network segregation. Certain network edges can be associated with certain logical partitions of the communications network. When a demand is associated with one logical partition, the cost function can penalize the use of communications links associated with another partition.

As may be appreciated, assigning costs to paths based at least in part on characteristics of the communications links can enable implementation of network segregation schemes and improve service by prioritizing communication links with favorable physical length, delay or latency, or operational cost characteristics.

In some embodiments, the cost function can encourage efficient assignment of routes to frequency slots. The efficiency of an assignment of routes to frequency slots can depend on the effect of that assignment on subsequent assignments. A first assignment of routes to frequency slots can be more efficient than a second such assignment when the first assignment precludes fewer subsequent assignments of routes to frequency slots. For example, as described herein, a frequency slot assignment that completely fills a "hole" between two unavailable frequency slot assignments can be more efficient than a frequency slot assignment that divides an existing set of contiguous available frequency slots into two non-contiguous subsets.

As may be appreciated, increasing the efficiency of frequency slot usage can improve the capacity of the communication network. For example, the communication network can satisfy more demands, or satisfy the same amount of demands using fewer resources. Accordingly, the disclosed embodiments, by improving the efficiency of assignments of routes to frequency slots, constitute a technological improvement in network communications management.

Consistent with disclosed embodiments, given a set of exclusive paths for demands associated with a communication network, the disclosed embodiments can determine restoration routes for the demands. The number or type of restoration route can depend on a type of the demand. A restoration route for a demand can include combinations of frequency slots and layer graph edges used by the exclusive path for the demand. In some embodiments, the restoration route can exclude combinations of frequency slots and layer graph edges used by exclusive paths for other demands. The restoration path can be selected using a cost function, as disclosed herein. As may be appreciated, the generation of restoration routes can improve the flexibility and resilience of the communication network.

Accordingly, for at least the foregoing reasons, the disclosed embodiments constitute a technological improvement in network communications management.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120 or of the communication links connecting them, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first and second signals can be non-overlapping in the frequency spectrum. In some embodiments, the WDM physical layer can be or support an elastic optical network (e.g., a "Flexgrid" network or the like). For convenience of explanation, frequency slots are depicted as contiguous subsets of an array of unit frequency slot widths. The width of the frequency slot is the number of unit frequency slot widths in the contiguous subset. The central frequency of the frequency slot is the midpoint of the contiguous subset. Without departing from envisioned embodiments, the disclosed embodiments may be implemented using central frequencies and frequency slot widths demarcated in Hz (e.g., integer multiples of 6.25 GHz, 12.5 GHz, or other base values; arbitrary spectrum bands defined by central frequencies and bandwidths, or other suitable schema).

Figure 2:
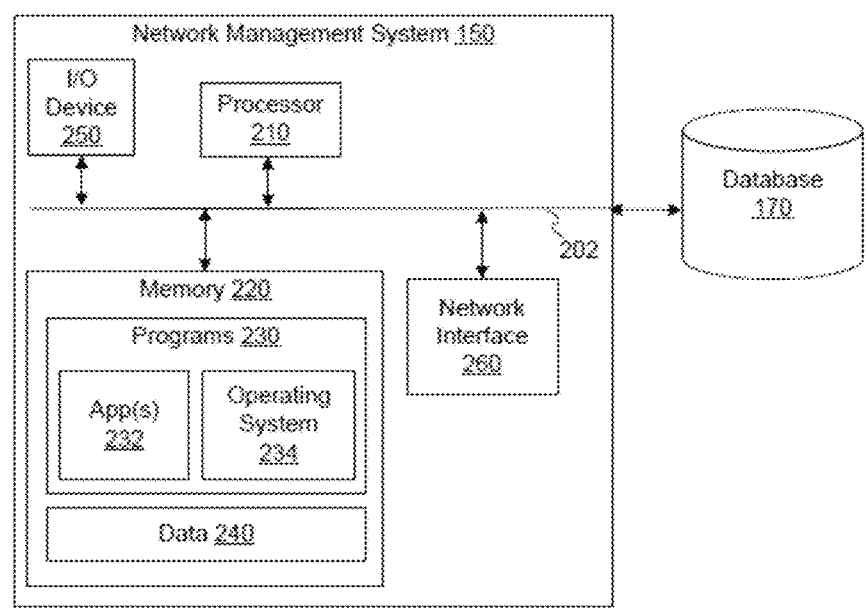
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device (s) implementing the one or more of nodes 120, to perform systems and methods for configuring the communication network to satisfy one or more demands using routes corresponding to determined paths on a network graph corresponding to the communication network.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3:
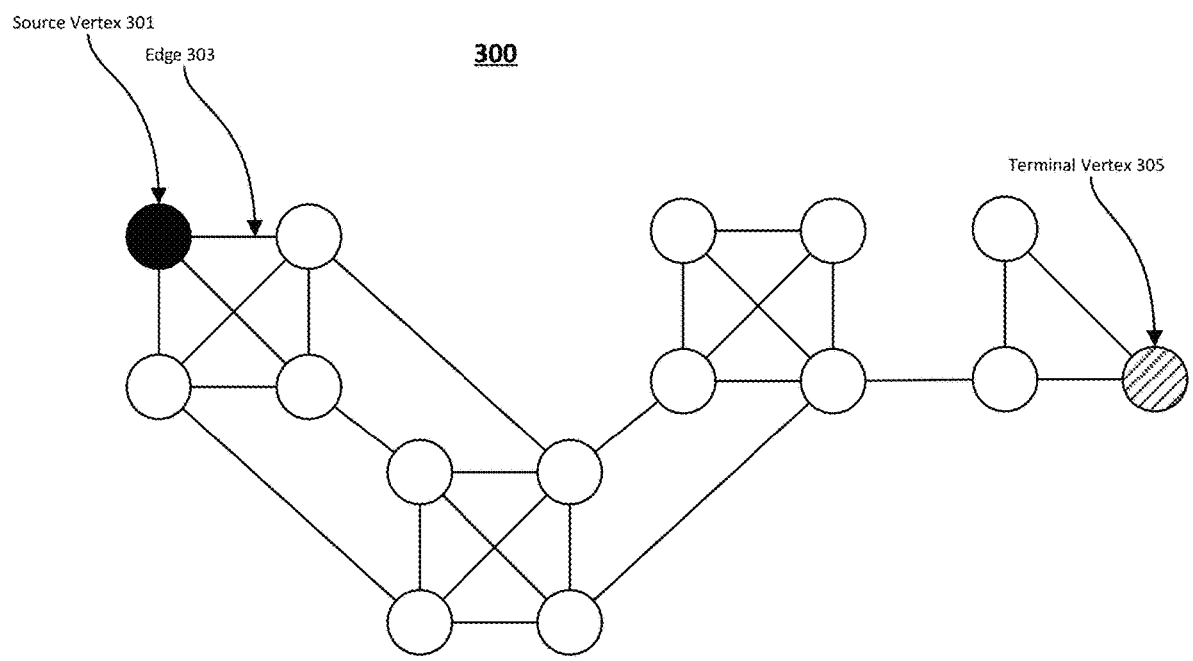
FIG. 3 depicts an exemplary network graph corresponding to an optical communication network that supports wavelength division multiplexing, consistent with disclosed embodiments.

FIG. 3 depicts an exemplary network graph 300 corresponding to an optical communication network that supports wavelength division multiplexing, consistent with disclosed embodiments. Network graph 300 includes vertices (e.g., source network graph vertex 301, terminal network graph vertex 305, etc.) that correspond to nodes of the optical communication network and edges (e.g., network graph edge 303, etc.) that correspond to communication links in the optical communication network. In this example, a demand on the optical communications network originates at a source node corresponding to source network graph vertex 301 and terminates at a terminal node corresponding to terminal network graph vertex 305.

FIGS. 4A to 4E depict exemplary layer graphs corresponding to the network graph of FIG. 3, consistent with disclosed embodiments. Each of these layer graphs corresponds to a different frequency slot in a set of frequency slots. As may be appreciated, the frequency slots in such a set can have different combinations of central frequency and frequency slot width.

Figure 4A:
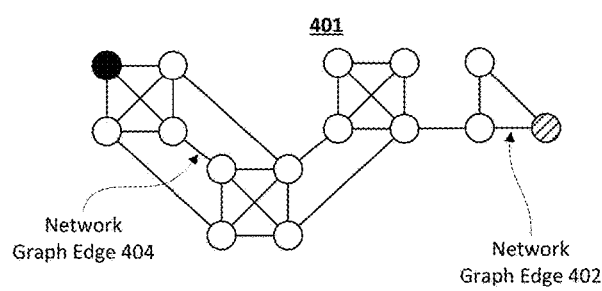
FIGS. 4A to 4E depict exemplary layer graphs corresponding to the network graph of FIG. 3, consistent with disclosed embodiments.
Figure 4D:
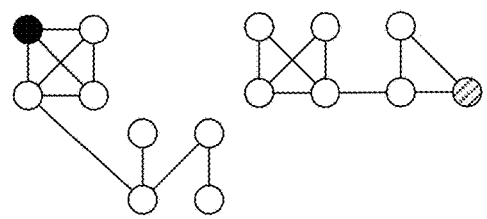
Figure 4B:
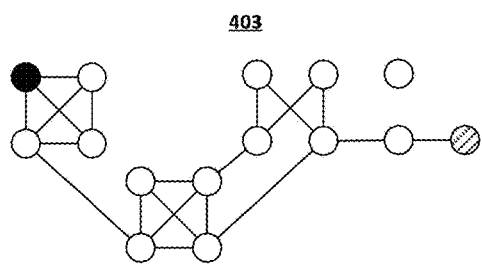
Figure 4E:
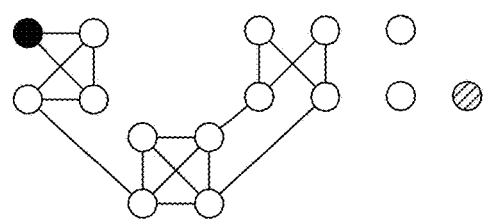
Figure 4C:
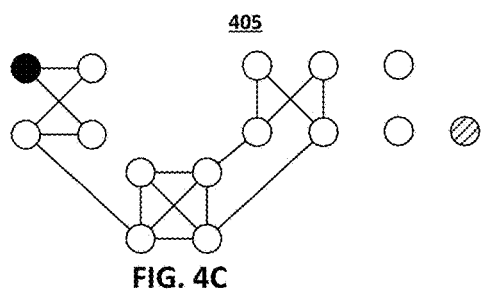

A layer graph corresponding to a frequency slot includes edges corresponding to communication links for which that frequency slot is available. For example, FIG. 4A depicts a layer graph 401 that includes network graph edges 402 and 404. The inclusion of these edges indicates that the frequency slot corresponding to layer graph 401 is available for the communication links corresponding to network graph edges 402 and 404. However, network graph edge 404 is absent from layer graphs 403, 405, 407, and 409. This absence indicates that the frequency slots corresponding to layer graphs 403, 405, 407, and 409 are unavailable for the communication link corresponding to network graph edge 404. Similarly, network graph edge 402 is absent from layer graphs 405 and 409. This absence indicates that the frequency slots corresponding to layer graphs 405 and 409 are unavailable for the communication link corresponding to network graph edge 404. The disclosed embodiments are not limited to any particular reason for the unavailability of a frequency slot at a communication link. In some instances, the frequency slot may already be assigned to another route or may conflict with a frequency slot already assigned to another route. For example, in some instances, the frequency slot may not satisfy a usage condition, such as signal-to-noise ratio, cost, membership in a logical or physical network partition, or the like. In some instances, the frequency slot may lack a corresponding transceiver between the nodes that constitute the endpoints of the communication link. For example, the nodes constituting the endpoints of the communication link corresponding to network graph edge 402 may include a first transceiver capable of supporting the frequency slots corresponding to layer graph 401 and layer graph 403, and a second transceiver capable of supporting the frequency slot corresponding to layer graph 407. However, these nodes may lack transceivers capable of supporting the frequency slots corresponding to layer graphs 405 and 409.

Figure 5:
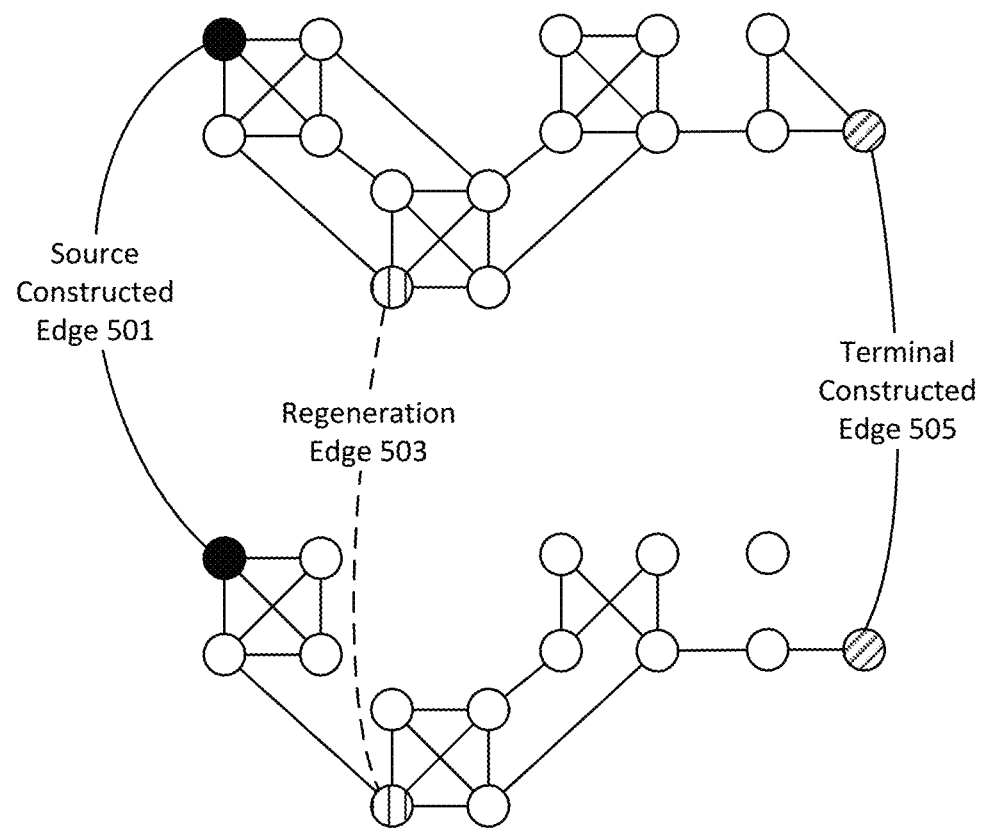
FIG. 5 depicts an exemplary combined layer graph, consistent with disclosed embodiments.

FIG. 5 depicts an exemplary combined layer graph 500, consistent with disclosed embodiments. The exemplary combined layer graph 500 includes both layer graph 401 and layer graph 403 from FIGS. 4A and 4B. Combined layer graph 500 can be generated for a demand by connecting layer graphs using constructed edge(s). The constructed edge(s) can enable a network management system to search the layer graphs comprising the combined layer graph for a path in a single search.

In some embodiments, the source layer graph vertices corresponding to the demand can be connected using source constructed edges (e.g., source constructed edge 501). In some embodiments, the terminal layer graph vertices corresponding to the demand can be connected using terminal constructed edges (e.g., terminal constructed edge 503). As described herein, a path can then be determined from a source layer graph vertex to a terminal layer graph vertex.

In some embodiments, the network management system can be configured to identify a path based on scores associated with the layer graph edges. In such embodiments, a score associated with a constructed edge can be selected such that this score does not affect the determination of the paths (e.g., the score can be zero, or otherwise substantially less than the scores associated with the layer graph edges).

In some embodiments, the network management system can be configured to add one or more regeneration edges (e.g., regeneration edge 503) to the combined layer graph. A regeneration edge can connect two layer graph vertices that correspond to the same node of the communication network. The regeneration edge can represent use of a regenerator in the node of the communication network. Such a regenerator can be configured to enable the node to receive a transmission in one frequency slot and provide the transmission in another frequency slot. In some embodiments, the regenerator may convert an original optical signal in the original frequency slot into an electrical signal. The electrical signal can then be converted into an optical signal in the second frequency slot. As may be appreciated, including regeneration edges can increase the flexibility of the path-finding and may therefore increase the likelihood of identifying a configuration of the communication network capable of satisfying a set of demands.

As described herein, the network management system can be configured to identify a path based on scores associated with the layer graph edges. In such embodiments, the score associated with the regenerator edge can be selected such that this score affects the determination of the paths. In some embodiments, the score can be such that the path only includes the regenerator edge when no other path can be identified. In some embodiments, the score for the regenerator edge can be greater than some statistic (e.g., median, mean, 95th percentile, mean plus some scaled standard deviation, maximum, or the like) of the edge scores for the edges in the layer graphs comprising the combined layer graph.

Figure 6A:
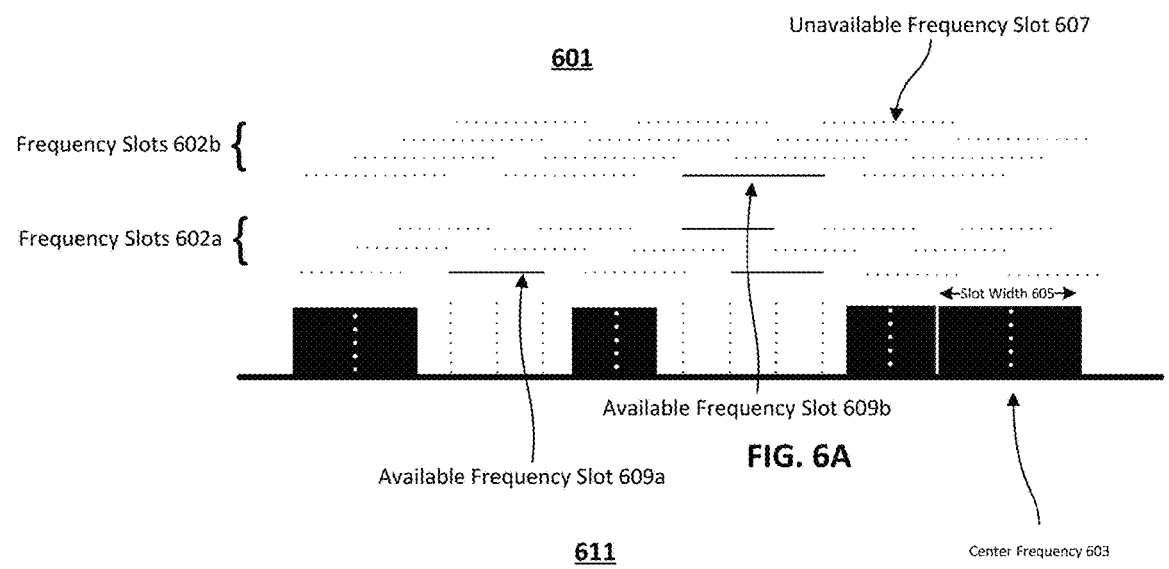
FIG. 6A depicts exemplary frequency slots on a frequency spectrum, consistent with disclosed embodiments.
Figure 6B:
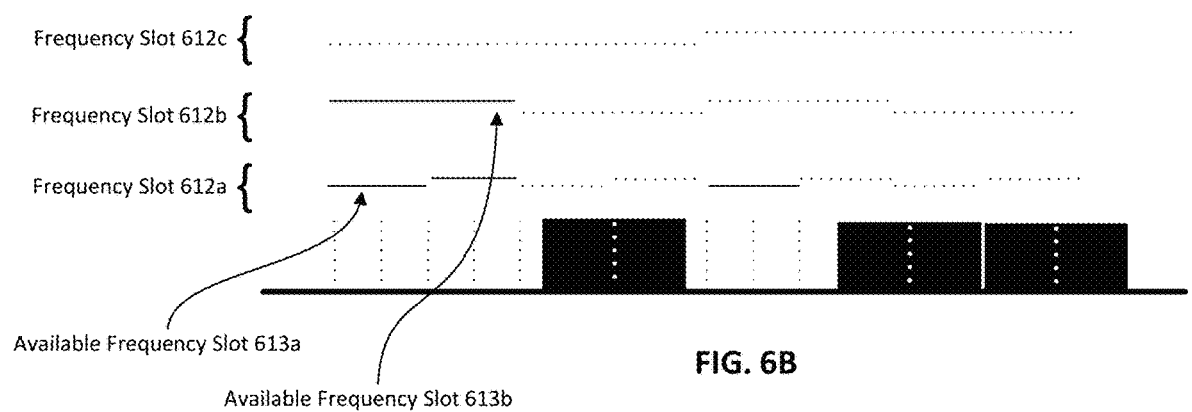
FIG. 6B depicts exemplary frequency slots on a frequency spectrum subject to spectrum compaction, consistent with disclosed embodiments.

FIGS. 6A and 6B depict exemplary relationships between sets of central frequencies on frequency spectrums 601 and 611 and sets of potential frequency slots, consistent with disclosed embodiments. In this example, the frequency spectrums can correspond to communication links in a communication network. The frequency spectrum can be associated with frequency slots usable to transmit information across the communication link. Consistent with disclosed embodiments, the required bandwidth for a demand, the available types of transceivers, costs or signal-to-noise considerations, or the like may determine the set of potential frequency slots usable for a route in the communication network.

In FIGS. 6A and 6B, unavailable portions of the frequency spectrum are indicated with dark boxes. In some instances, an unavailable portion of a frequency spectrum can correspond to one or more in-use frequency slots. An in-use frequency slot can be characterized by a center frequency (e.g., center frequency 603) and a frequency slot width (e.g., slot width 605). In some instances, an unavailable portion of the frequency spectrum can arise from a technical limitation of the communication link, such as an inability of the communication link to support transmission in a particular frequency range.

As depicted in FIGS. 6A and 6B, the communication links corresponding to frequency spectrums 601 and 611 can potentially support frequency slots of multiple frequency slot widths. The communication link corresponding to frequency spectrum 601 can support frequency slots of frequency slot width two (e.g., frequency slots 602a) and frequency slots of frequency slot width three (e.g., frequency slots 602b). The communication link corresponding to frequency spectrum 611 can support frequency slots of frequency slot width two (e.g., frequency slots 612a), frequency slots of frequency slot width three (e.g., frequency slots 612b), and frequency slots of frequency slot width four (e.g., frequency slots 612c). In practice, a communication link may support additional sets of frequency slots (e.g., frequency slots of frequency slot width one, or of other additional frequency slot widths).

As depicted in in FIGS. 6A and 6B, some of the potential frequency slots are available (indicated with solid lines), while other frequency slots are unavailable (indicated with dotted lines). In this example, unavailable frequency slots overlap with unavailable portions of a frequency spectrum. For example, unavailable frequency slot 607 has a frequency slot width of three and overlaps with an unavailable portion of frequency spectrum 601. Available frequency slots may have differing frequency slot widths. For example, available frequency slots 609b and 613b are of frequency slot width three, while available frequency slots 609a and 613a are of frequency slot width two. Furthermore, available frequency slots can overlap. For example, available frequency slots 613a and 613b can overlap. In some embodiments, when available frequency slots overlap, only one of the overlapping frequency slots may be used in a route. For example, including available frequency slots 613a in a route may cause frequency slot 613b to become unavailable.

In some embodiments, as depicted in FIG. 6A, frequency slots of the same frequency slot width can overlap. In this example, potential center frequencies are separated by a bandwidth of one frequency unit and the minimum frequency slot width is one frequency unit. Consecutive frequency slots of frequency slot width two (e.g., ones of frequency slots 602a) can overlap by one frequency unit, while consecutive frequency slots of frequency slot width three (e.g., ones of frequency slots 601b) can overlap by two frequency units.

In some embodiments, the communication network can enable overlapping frequency slots. For example, nodes in the communication network may include transceivers capable of supporting overlapping frequency slots. In some embodiments, the network management system can be configured to permit overlapping frequency slots. As may be appreciated, permitting overlapping frequency slots may increase the number of potential configurations of the communication network. Accordingly, permitting overlapping frequency slots may increase the flexibility or capacity of the communication network, potentially at the expense of increasing the computational resources required to identify routes for a set of demands on the communication network.

In some embodiments, as depicted in FIG. 6B, frequency slots of the same frequency slot width may not overlap. In effect, the frequency spectrum can be compacted, reducing the number of potential frequency slots on the frequency spectrum. Such frequency spectrum compaction may greatly reduce the number of potential frequency slots on the frequency spectrum, particularly for higher frequency slot widths. Accordingly, such frequency spectrum compaction may decrease the computational resources required to identify routes for a set of demands on the communication network, potentially at the expense of decreasing the flexibility or capacity of the communication network.

In some embodiments, frequency compaction can be performed by dividing the frequency spectrum into an array of contiguous unit-width frequency slots. The unit width can be a divisor (or approximate divisor) of the bandwidths associated with the transceivers associated with demands on the communication network. For example, a common divisor can be determined for the transceivers associated with the demands:

$$(m_i - 1) \cdot \omega < \omega_i \leq m_i \cdot \omega$$

where $\omega_i$ is the bandwidth of transceiver i, $\omega$ is a common divisor, and $m_i$ is an integer. The frequency spectrum can then be divided into an array of contiguous slots of unit width $\omega$. A demand using transceiver i will then use $m_i$ contiguous unit-width slots on the frequency spectrum. In some embodiments, ω can be the greatest common divisor of the bandwidths of the transceivers associated with the demands. In some embodiments, ω can be selected such that the size of the array of contiguous slots is less than some number n. In some embodiments, ω can be selected such that the unused spectrum is minimized over the set of transceivers associated with the demands. For example:

$$\operatorname*{argmin}_{\omega} \sum_{i} (m_i \cdot \omega - w_i)^2$$

where ω is selected to minimize the sum of squared differences between the array width and the bandwidth required over the transceiver types (e.g., minimize the unused frequency spectrum).

In some embodiments, frequency slots of different widths can be aligned to the same end of the array of contiguous slots of unit width. For example, the frequency spectrum depicted in FIG. 6B can be represented as an array X of continuous frequency slots. The array can have a size 8. Available frequency slot 613a would then occupy X(0), while available frequency slot 613b would then occupy X(0) and X(1). The first, unavailable frequency slot of frequency slots 612c would then occupy X(0) to X(3). In some embodiments, frequency slots of different widths need not be aligned to the same end of the array of contiguous slots of unit width. To continue the prior example, a frequency slot could occupy X(1) and X(2), or X(1) to X(4).

Consistent with disclosed embodiments, a network management system can be configured to determine both exclusive routes and restoration routes for a set of demands on a communication network. An exclusive route can be associated with a demand and can satisfy that demand on the communication network. In some embodiments, the combinations of communication links and frequency slots included in an exclusive route cannot be used by other routes, so long as the exclusive route is satisfying the demand. A restoration route can be associated with a communication link included in the main path. The restoration route can be disjoint with the communication link and can enable the communication network to recover from a failure of the communication link.

Figure 7A:
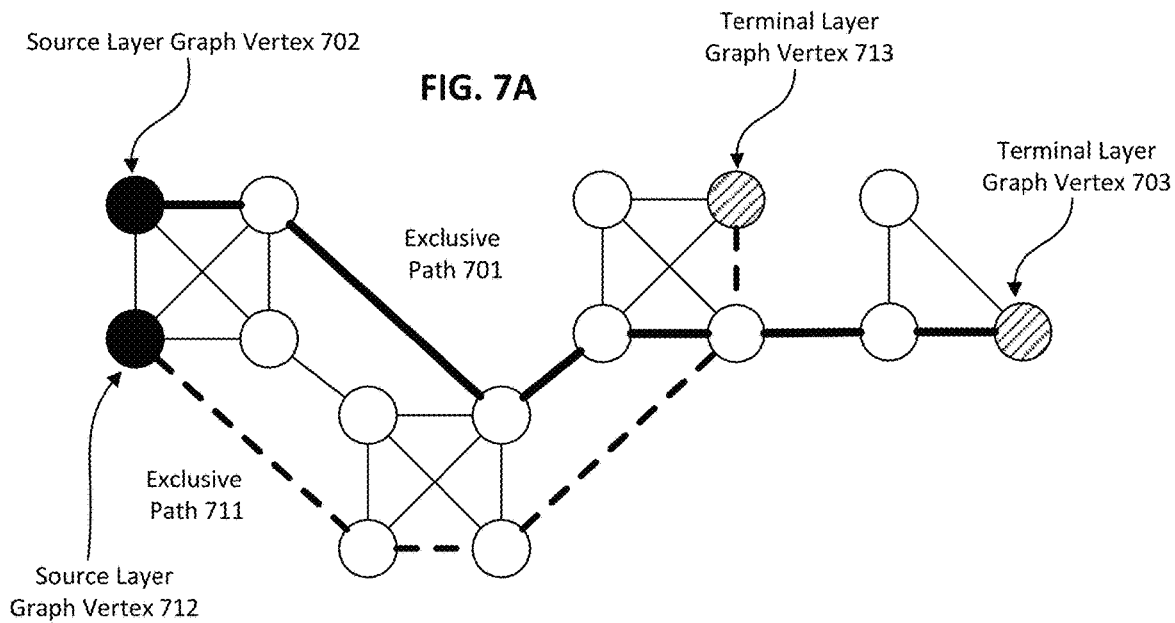
FIG. 7A depicts two exclusive paths on a layer graph, consistent with disclosed embodiments.

FIG. 7A depicts two exclusive paths on a layer graph, consistent with disclosed embodiments. The layer graph can include edges and vertices and can correspond to a communication network. The edges can correspond to communication links in the communication network for which the frequency slot is available. The vertices can correspond to nodes in the communication network that are the endpoints to such communication links. A path on the layer graph can correspond to a route on the communication network. The exclusive paths can correspond to routes used to satisfy demands on the communication network.

For example, exclusive path 701 can correspond to a route on the communication network that satisfies a first demand. The first demand can have a first source node corresponding to source layer graph vertex 702 and a first terminal node corresponding to terminal layer graph vertex 703. Exclusive path 701 can connect source layer graph vertex 702 to terminal layer graph vertex 703.

As an additional example, exclusive path 711 can correspond to a route on the communication network that satisfies a second demand. The second demand can have a second source node corresponding to source layer graph vertex 712 and a second terminal node corresponding to terminal layer graph vertex 713. Exclusive path 711 can connect source layer graph vertex 712 to terminal layer graph vertex 713.

Figure 7B:
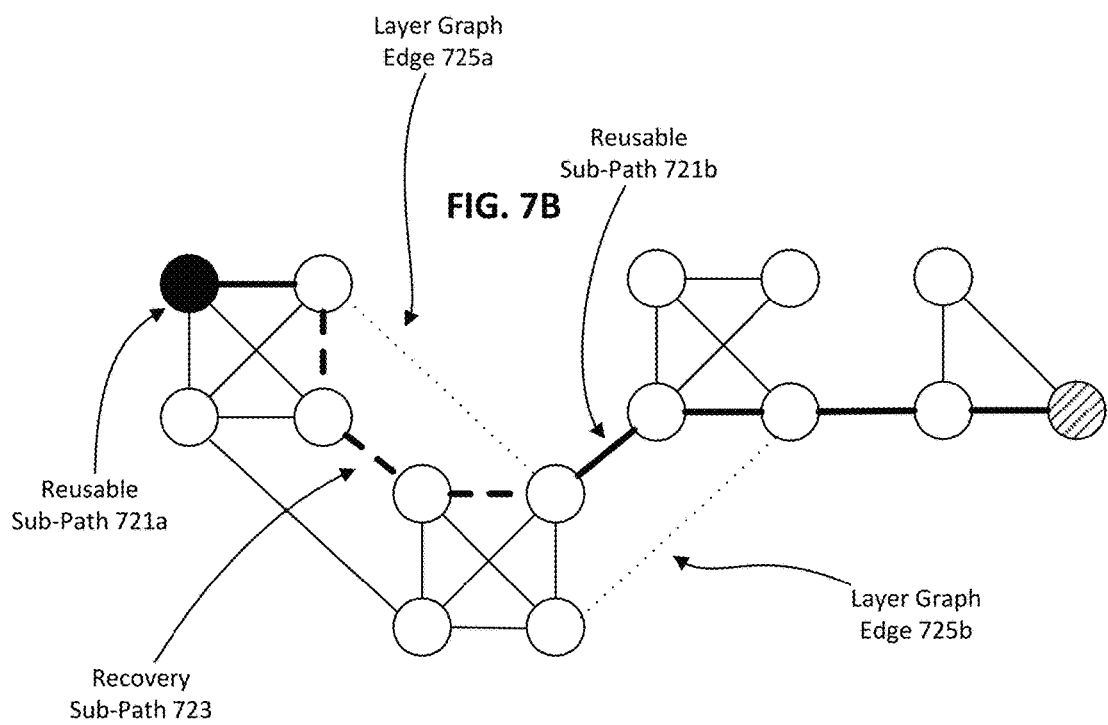
FIG. 7B depicts reusable portions of one of the two exclusive paths, consistent with disclosed embodiments.

FIG. 7B depicts a recovery path corresponding to an exclusive path (e.g., exclusive path 701), consistent with disclosed embodiments. The communication network can be configured to implement the recovery path in response to a determination that a route implementing the exclusive path has failed or otherwise become inoperable. The layer graph edges included in a recovery path can depend on the exclusive path corresponding to the recovery path. Determination of the recovery path can prioritize layers or edges originally included in the corresponding exclusive path.

In the example depicted in FIG. 7B, communication links implementing exclusive path 701 and exclusive path 711 have failed. The failed communication links correspond to layer graph edges 725a and 725b. Accordingly, these layer graph edges cannot be included in a recovery path. In some embodiments, layer graph edges originally included an exclusive path can be reserved for use in a corresponding recovery path. For example, reusable portions 721a and 721b can be reserved for inclusion in a recovery path corresponding to exclusive path 701. Accordingly, a recovery path corresponding to exclusive path 711 may not include layer graph edges in reusable portions 721a or 721b.

In this example, a recovery path can be determined for exclusive path 701. The recovery path can include reusable sub-path 721a, recovery sub-path 723, and reusable sub-path 721b. However, due to the failure of the communication link corresponding to layer graph edge 725b and the reservation of reusable sub-path 721b, the layer depicted in FIG. 7B may not support a recovery path for exclusive path 711. A recovery path may still be identified in other layer graphs.

As may be appreciated, once a recovery path corresponding to an exclusive path has been identified, any layer graph edges previously included in the exclusive path, but not included in the recovery path, can become available for use by other exclusive or recovery paths.

Figure 8:
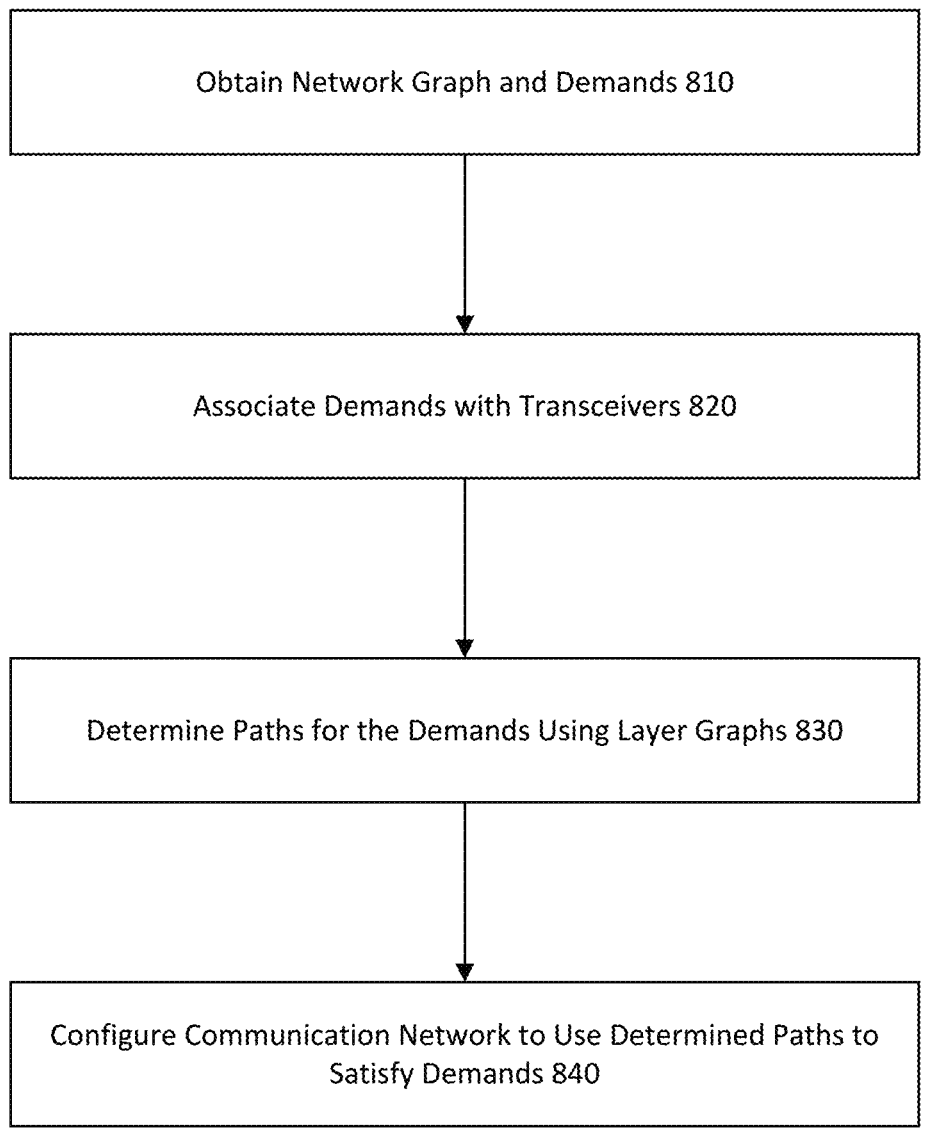
FIG. 8 depicts an exemplary process for configuring a communications network to use paths to satisfy demands having source and terminal nodes on the communication network, consistent with disclosed embodiments.

FIG. 8 depicts an exemplary process 800 for configuring a communications network (e.g., communication network 160, or the like) to satisfy demands on the communications network, consistent with disclosed embodiments. For convenience of description, exemplary process 800 is described herein as being performed by a network management system (e.g., network management system 150, or the like). However, the disclosed embodiments are not so limited. In some embodiments, exemplary process 800 can be performed by another component of the communications network (e.g., one or more of nodes 120, or the like), or another system.

Exemplary process 800 can be performed as a one-time activity. For example, exemplary process 800 can be performed upon initialization of a network node, sub-network, or communication network. Exemplary process 800 can be performed according to a schedule (e.g., hourly, daily, multiple times per day or week, monthly, or the like) or in response to an event. The event can concern the demands on the communication network, the status of the communication network, receipt of an instruction or command, or the like. A change in the demands on the communication network can include a change in the set of demands on the communication network (e.g., addition or removal of a demand) or in characteristics of one or more of the demands (e.g., change in volume, OSNR requirements, or the like). A change in the status of the communication network can include the addition or removal of a node, a communication link connecting two nodes, or a combination of a communication link and a frequency slot (or transceiver, or portion of a frequency spectrum). For example, addition of a new node connected to the rest of the communication network through one or more communication links can trigger performance of process 800. Similarly, the failure of a transceiver on a communication link, resulting in the inability to use frequency slots corresponding to that transceiver on that communication link, can trigger performance of process 800. An instruction or command can expressly or implicitly request performance of process 800 (e.g., from a user of the communication network, an administrator of the communication network, etc.), or the like.

In step 810 of process 800, the network management system can obtain a network graph, consistent with disclosed embodiments. The network graph can correspond to a communication network. The network graph can include vertices corresponding to nodes in the communication network. In some embodiments, a node in the communication network can be a sub-network on the communication network. The network graph can include edges corresponding to communication links in the communication network. In some embodiments, a communication link can have a set of available frequency slots (e.g., determined by the implementation of the communication link, the equipment of the nodes connected to the communication link, or the like). Accordingly, an edge representing the communication link can be associated with a set of available frequency slots. As may be appreciated, an overall set of frequency slots may be associated with the communication network. The overall set of frequency slots can include the union of the sets of frequency slots associated with the edges in the network graph. Accordingly, an edge can be associated with an available subset of the overall set of frequency slots for the communication network.

Obtaining the network graph can include receiving or retrieving the network graph from another component of the communication system (e.g., one or more of nodes 120, database 170, or the like), from another system, from a memory accessible to the network management system, or the like. Obtaining the network graph can include obtaining the network information specifying the topology of the communication network (e.g., and the capabilities of the nodes and communication links). Such network information can be received or retrieved from another component of the communication system, from another system, or from a memory accessible to the network management system, or the like. The network management system can create (or update) the network graph using the received or retrieved network information.

In step 810 of process 800, the network management system can obtain a set of demands on the network, consistent with disclosed embodiments. A demand can specify a source node and a terminal node on the communication network. In some embodiments, a demand can have demand characteristics. Demand characteristics can include constraints on transceivers or on routes for satisfying the demand. Transceiver constraints can include frequency slot width, line rate, OSNR, transceiver cost, or the like. Route constraints can include maximum route length, minimum route capacity or available capacity, route cost, number of communication links or nodes traversed, or the like. Route constraints can specify that a recovery route and an exclusive route for a demand be node or shared risk link group (SRLG) disjoint. Demand characteristics can include constraints specifying a protection type. The protection type can specify that a recovery route exist for any communication link failure (e.g., 1+R protection), that a recovery route exist for any two communication link failures (e.g., 1+R+R protection), that two completely disjoint routes exist (e.g., 1+1 protection), or another suitable protection type. Demand characteristics can include constraints specifying that a recovery route use the same frequency slot as the original exclusive route.

In step 820 of process 800, the network management system can associate demands with transceivers, consistent with disclosed embodiments. In some embodiments, each demand can be associated with a transceiver. In some embodiments, demands can be associated with transceivers based on demand characteristics and transceiver characteristics. Transceiver characteristics can include OSNR, maximum route length, frequency slot width, cost, line rate, or like characteristics. A transceiver selected for a demand can have characteristics that satisfy constraint(s) specified for the demand. For example, a demand can have constraint(s) regarding line rate, OSNR, or frequency slot width. The network management system can select a transceiver for a demand based on at least one of the line rate, OSNR, or frequency slot width of the transceiver. For example, the network management system can select a transceiver with a line rate exceeding a minimum line rate, the transceiver having the greatest transmission length or OSNR, the transceiver with the minimum frequency slot width such that the transmission length or OSNR constraints are likely satisfied (e.g., based on a preliminary evaluation of path lengths). As a further example, transceivers can be selected that satisfy a specific contiguous array of frequency slots (e.g., as depicted in FIG. 6B).

Consistent with disclosed embodiments, the network management system can associate transceivers with frequency slot widths. For example, a transceiver may have a fixed frequency slot width or a configurable frequency slot width. A demand associated with a transceiver can therefore also be associated with a frequency slot width (or with multiple frequency slot widths). When a transceiver can be associated with multiple frequency slot widths, some of the frequency slot widths may not satisfy constraints on the demand. For example, a wider frequency slot width may support increased capacity, OSNR, or transmission distance. Accordingly, only some of the frequency slot widths supported by a transceiver may be associated with a corresponding demand.

In step 830 of process 800, the network management system can be configured to determine paths for the demands using layer graphs, consistent with disclosed embodiments. In some embodiments, the network management system can iteratively determine sets of paths for selected subsets of the demands. In each iteration, the network management system can obtain a set of layer graphs corresponding to the selected demands. The network management system can then identify sets of paths for the selected demands using the set of layer graphs. The identified sets of paths can be included in a set of determined paths. In some embodiments, when path(s) cannot be determined for a demand, process 800 may terminate. In some embodiments, when path(s) cannot be determined for a demand, process 800 may skip the demand. In some embodiments, process 800 can proceed to step 840 when the set of determined paths includes paths for all of the demands (or all demands for which path(s) could be determined).

In some embodiments, the network management system can select demands based on frequency slot widths. In some embodiments, the network management system can select a frequency slot width and then select the demands associated with frequency slots having the selected frequency slot width. In some embodiments, the network management system can select progressively narrower frequency slot widths. In some embodiments, the network management system can select in a first iteration the widest frequency slot width among the frequency slots associated with the demands (or with the communication network).

Consistent with disclosed embodiments, the network management system can generate, for each of the selected demands, one or more sets of candidate paths. In some embodiments, the network management system can generate a set of layer graphs based on the frequency slots associated with the selected demands. The network management system can then generate the set of candidate paths using the layer graphs.

In some embodiments, the network management system can determine candidate path(s) for a demand by searching individual layer graphs for suitable path(s). In some embodiments, as depicted in FIG. 5, the network management system can construct a combined layer graph including one or more constructed edges. The combined layer graph may additionally include one or more regeneration edges. The network management system can search the combined layer graph for suitable candidate path(s).

In some embodiments, the network management system can generate multiple sets of candidate paths for a demand subject to differing sets of constraints. The multiple sets of candidate paths can include a reference set of candidate paths, generated subject to mandatory constraints. Additional sets of candidate paths can be generated subject to both the mandatory constraints and sets of optional constraints. In some embodiments, the network management system can select among the multiple sets of candidate paths for the demand according to a constraint selection criterion. The constraint selection criterion can be (or include being) the set of candidate paths with the lowest value of a specific metric (e.g., average—or other function—of OSNR, length of corresponding routes on the communication network, numbers of vertices or edges included in the paths, path scores, or the like), the lowest total cost, the set of candidate paths that affects the minimal number of layers, the set of candidate paths with the lowest frequency slot (e.g., with the lowest frequency slot central frequency), or another suitable criterion.

In some embodiments, the network management system can generate a single set of candidate paths for a demand. The single set of candidate paths for the demand can be generated according to a single set of constraints.

Consistent with disclosed embodiments, the network management system can select among the sets of candidate paths for the demands. The network management system can select among the sets of candidate paths according to a candidate selection criterion. The candidate selection criterion can be (or include being) the set of candidate paths with the lowest value of a specific metric (e.g., average—or other function—of OSNR, length of corresponding routes on the communication network, numbers of vertices or edges included in the paths, path scores, or the like), the lowest total cost, the set of candidate paths that affects the minimal number of layers, the set of candidate paths with the lowest frequency slot (e.g., with the lowest frequency slot central frequency), or another suitable criterion.

In some embodiments, the candidate selection criterion used to select among the sets of candidate paths for multiple demands can differ from any constraint selection criterion used to select among sets of candidate paths for a single demand generated using differing sets of constraints and/or from any score function used to generate the candidate paths.

As may be appreciated, the more demands that rely upon a single node or SRLG in the communication network, the greater the impact of a failure of that node or SRLG. Accordingly, in some embodiments, the network management system can avoid assigning the same resources (e.g., node, communication links, SRLGs) to implement exclusive routes for multiple demands.

Consistent with disclosed embodiments, the selected set of candidate paths can be added to a set of determined candidate paths. The selected demands can be updated to remove the demand corresponding to the selected set of candidate paths. The layer graphs can be updated to remove layer graph edges that conflict with the layer graph edges included in the selected set of candidate paths. The conflicting layer graph edges can include layer graph edges that correspond to the same communication link and overlapping frequency slots (or the same frequency slot). The sets of candidate paths can be updated to remove the selected set of candidate paths. Furthermore, candidate paths can become invalid due to the updated layer graphs. The network management system can identify and determine replacements for such invalid candidate paths.

In some embodiments, when the network management system cannot identify a replacement for an invalid candidate path, process 800 can terminate. In some embodiments, when the network management system cannot identify a replacement for an invalid candidate path, process 800 can return to step 820. In some embodiments, a new transceiver can be determined for the demand associated with the invalid candidate path. A new set of candidate paths can then be determined for this demand in step 830. In some embodiments, new transceivers can be determined for the demands lacking candidate paths in the set of determined candidate paths. New sets of candidate paths can then be determined for these demands in step 830. In some embodiments, new transceivers can be determined for all demands. New sets of candidate paths can then be determined for all demands in step 830.

In step 840, the network management system can configure the communication network to use routes implementing the determined candidate paths for the demands, consistent with disclosed embodiments. In some embodiments, the network management system can provide instructions to other components of the communication network (e.g., nodes 120, database 170, or the like). In some embodiments, the instructions can be received or retrieved by the node(s) of the communication network from the network management system or another component of the communication network (e.g., database 170, another node of the communication network). When processed by the components, the instructions can cause the components to (e.g., collectively) implement the selected routes for the demands.

Figure 9:
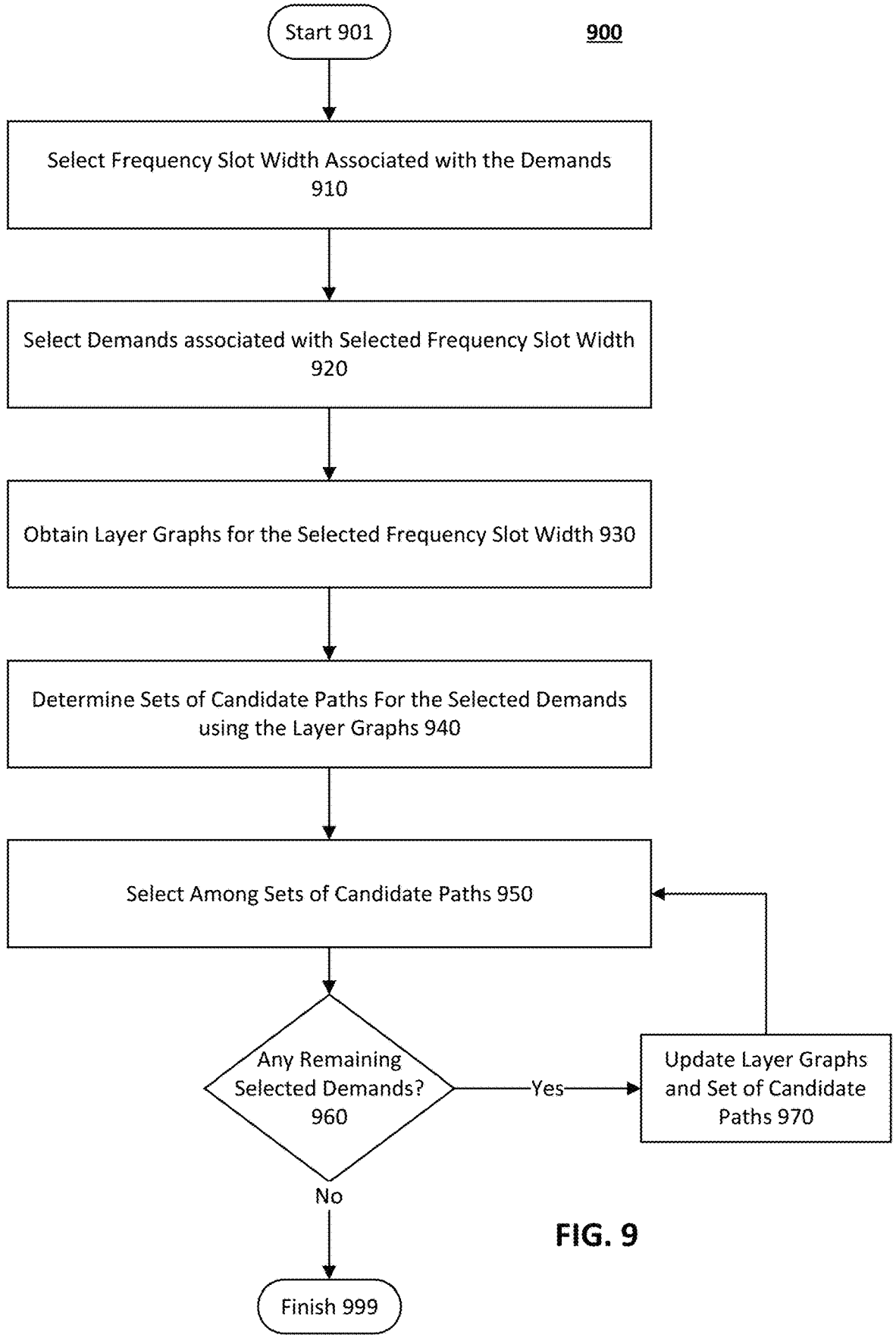
FIG. 9 depicts an exemplary process for generating and selecting among candidate paths for demands having source and terminal nodes on the communication network, consistent with disclosed embodiments.

FIG. 9 depicts an exemplary process 900 for generating and selecting among candidate paths for demands having source and terminal nodes on a communication network (e.g., communication network 160, or the like), consistent with disclosed embodiments. For convenience of explanation, process 900 is described as being performed by a network management system of a communication system (e.g., management system 150 of communication system 100). However, the disclosed embodiments are not so limited. Consistent with disclosed embodiments, process 900 can be performed at least in part by another component of the communication system, or another system.

In step 901, process 900 can start. In some embodiments, process 900 can be performed as part of another process. For example, process 900 can be performed as part of process

800 in step 830 (or the like). Alternatively, process 900 can be performed separately from process 800.

Consistent with disclosed embodiments, the network management system can obtain demands and frequency slots. In some embodiments, the frequency slots can include the frequency slots useable on the communication links of the communication network. In some embodiments, the frequency slots can include frequency slots associated with the demands. For example, as described herein, a demand can be associated with a transceiver. The transceiver can be associated with a frequency slot or set of frequency slots. The frequency slot or set of frequency slots can therefore be associated with the demand. In some embodiments, the network management system can obtain constraints associated with the demands. Such constraints can include mandatory constraints and optional constraints, as described herein.

In step 910 of process 900, the network management system can select a frequency slot width, consistent with disclosed embodiments. In some embodiments, the network management system can select the frequency slot width based on the widths of the obtained frequency slots. For example, the selected frequency slot width can be the widest of the frequency slot widths.

In step 920 of process 900, the network management system can select demands associated with the selected frequency slot width, consistent with disclosed embodiments. A frequency slot or set of frequency slots can be associated with a demand. In some embodiments, when the frequency slot has the selected frequency slot width (or the set of frequency slots includes a frequency slot having the selected frequency slot width), the network management system can select the demand. When the network management system selects the widest frequency slot width in step 910, for example, the network management system can select the demands associated with frequency slots having the widest frequency slot width.

In step 930 of process 900, the network management system can obtain layer graphs for the selected frequency slot width, consistent with disclosed embodiments. As described herein with respect to FIGS. 4A to 4E, a layer graph corresponding to a frequency slot can include layer graph edges corresponding to communication links in the communication network for which that frequency slot is available. In some embodiments, the network management system can receive or retrieve the layer graphs from another component of the communication network or another system (e.g., in step 901). In some embodiments, the network management system can create the layer graphs. The network management system can create the layer graphs before starting process 900 (e.g., as part of process 800, or another process) or after starting process 900 (e.g., in step 901). In some embodiments, the network management system can obtain layer graphs for the obtained frequency slots (or the frequency slots associated with the obtained demands). The network management system can then select the layer graphs corresponding to frequency slots having the selected frequency slot width. In various embodiments, the network management system can obtain only the layer graphs corresponding to the selected frequency slot width.

In step 940, the network management system can determine sets of candidate paths for the selected demands using the layer graphs, consistent with disclosed embodiments. The network management system can determine a set of candidate paths for a demand. The number of candidate paths in the set of candidate paths for a demand can depend on characteristics of the demand. For example, a protection type of the demand can specify the existence of two disjoint exclusive paths for the demands. In some embodiments, the network management system can determine multiple sets of potential candidate paths subject to varying sets of constraints. The network management system can select one of the multiple sets of potential candidate paths as the set of candidate paths.

Consistent with disclosed embodiments, the network management system can determine a candidate path for a demand. In some embodiments, the network management system can individually search each layer graph for candidate path(s) from the source layer graph vertex to the terminal layer graph vertex. In some embodiments, the network management system can create a combined layer graph using constructed edges (e.g., as depicted in FIG. 5). In some embodiments, the combined layer graph can include regeneration edges. The network management system can search the combined layer graph for candidate path(s) from the source layer graph vertex to the terminal layer graph vertex.

The disclosed embodiments are not limited to any particular method of determining a candidate path. In some embodiments, a suitable method that determines a path based on the scores of the layer graph edges (and/or vertices) included in the path can be used. For example, path-finding algorithms (e.g., depth-first search, breadth-first search, or the like), shortest-path algorithms (e.g., Dijkstra, Bellman-Ford, or the like), flow algorithms, minimal-cost flow algorithms, multi-constrained optimal path algorithms, or other suitable techniques can be used.

In some embodiments, a candidate path can be associated with a path score, which can depend on the scores of the layer graph edges (and/or vertices) included in the candidate path. The path score can additionally depend on the layer graph containing the path (or multiple layer graphs if the path includes a regeneration edge). In some embodiments, a frequency-dependent bias value associated can be associated with a frequency slot. The frequency-dependent bias value can be zero for some frequency slots and non-zero for other frequency slots, depend on the center frequency of the frequency slots (e.g., increase with increasing center frequency), or other suitable arrangements. The frequency-dependent bias value can be added to a path score for a path included in a layer graph corresponding to the frequency slot. As may be appreciated, such a frequency-dependent bias value can cause the network management system to prioritize the use of certain frequency slots.

The disclosed embodiments are not limited to any particular method of determining the scores of the edges (and/or vertices). In some embodiments, layer graph edge scores can depend on the topology of the layer graph, characteristics of the communication link represented by the layer graph edge, or other suitable factors. In some embodiments, a score for including a layer graph edge in a path can depend on alternatives foreclosed through such a choice. For example, two layer graphs may correspond to overlapping frequency slots. Each layer graph may include a layer graph edge corresponding to the same communication link in the communication network. Because the frequency slots corresponding to the layer graphs overlap, only one of the two layer graph edges may be included in a path. Thus, selecting one of the two layer graph edges for inclusion in a path can foreclose selection of the other layer graph edge for inclusion in the path (or another path). In some embodiments, layer graph edge scores can depend on the frequency slot corresponding to the layer graphs. For example, layer graph edge scores can include a frequency-slot dependent component. The frequency-slot dependent component can increase with increasing frequency slot central frequency. In this manner, the network management system can be configured to preferentially fill lower-frequency frequency slots.

In some embodiments, the network management system can determine multiple sets of potential candidate paths for a demand. The sets of potential candidate paths can be determined subject to varying sets of constraints. The sets of constraints can be increasingly restrictive. For example, a first set of candidate paths can be determined subject to a first set of constraints (e.g., constraints specified among the demand characteristics for the demand). A second set of candidate paths can be determined subject to a second, more restrictive set of constraints. In some embodiments, the second set of constraints can encompass the first set of constraints (e.g., a set of candidate paths that satisfies the second set of constraints always satisfies the first set of constraints). The second set of constraints can include the first set of constraints and additional constraints. In some embodiments, the first constraints can be mandatory constraints, in that failing to identify a route may be preferred (e.g., by a user of the communication network, or the like) to identifying a route that does not satisfy these constraints. In some embodiments, the additional constraints may be optional constraints, in that identifying a route that does not satisfy these additional constraints may be preferred to failing to identify a route, or to identifying a route that is too expensive according to some metric. In some instances, the additional constraints may improve the resilience or capacity of the communication network. For example, the additional constraints can specify that the second set of candidate paths be layer graph disjoint, layer graph edge disjoint, SRLG disjoint, use certain transceivers or frequency slots, or the like.

In some embodiments, the network management system can determine selection scores for the sets of potential candidate paths. In some embodiments, the network management system can determine a selection score for a set of potential candidate paths based on the layer graph edge scores, layer graph vertex scores, layer graph scores, or the like that are included in the potential candidate paths of the set of potential candidate paths. In some embodiments, the network management system can determine a path score for each path in a set of potential candidate paths. The network management system can then determine a selection score for the set of potential candidate paths based on the path scores for the set of potential candidate paths. For example, the selection score can be the sum of the path scores for the potential candidate paths. In some embodiments, the network management system can determine the selection score for the set of potential candidate paths based on a value of a specific metric (e.g., average—or other function—of OSNR, length of corresponding routes on the communication network, numbers of vertices or edges included in the paths, path scores, or the like), the total cost of the set of candidate paths, the number of layers affected by the set of candidate paths, a frequency slot number (e.g., based on an ordering of frequency slot central frequencies), or another suitable characteristic.

In some embodiments, the network management system can select among the sets of potential candidate paths based on the selection scores. In some embodiments, the network management system can determine a reference selection score. The reference selection score can be determined for the set of potential candidate paths identified subject to the least-restrictive set of constraints (e.g., only the mandatory constraints, or the like). The network management system can compare the reference selection score to alternative selection scores for other set(s) of potential candidate paths identified subject to other, more-restrictive sets of constraints (e.g., the mandatory constraints and the additional constraints, or the like). Based on the comparison, the network management system can select one of the sets of potential candidate paths. For example, given a reference selection score corresponding to a first set of potential candidate paths and an alternative selection score corresponding to a second set of potential candidate paths, the network management system can select the second set of potential candidate paths as the set of candidate paths for the demand when the alternative selection score exceeds the reference selection score by less than a threshold amount. Otherwise, the network management system can select the first set of potential candidate paths as the set of candidate paths for the demand.

In step 950 of process 900, the network management system can select among the sets of candidate paths, consistent with disclosed embodiments. The network management system can select among the sets of candidate paths based on the selection scores associated with each set of candidate paths. Accordingly, in some embodiments, the network management system can first select sets of candidate paths for demands from sets of potential candidate paths for the demands. The network management system can then select a particular set of candidate paths for a particular demand from among the sets of candidate paths for the demands.

Consistent with disclosed embodiments, the network management system can include the selected set of candidate paths set in a set of determined paths. The network management system can update the selected demands to indicate that a solution has been determined for the particular demand (e.g., by removing the particular demand from the selected demands, or through another suitable method).

In step 960 of process 900, the network management system can determine whether any remaining demands in the set of selected demands lack corresponding paths in the set of determined paths, consistent with disclosed embodiments. When such demands remain, process 900 can proceed to step 970. Otherwise, process 900 can proceed to step 999.

In step 970 of process 900, the network management system can update the layer graphs, consistent with disclosed embodiments. The layer graphs can be updated to remove layer graph edges included in the selected set of candidate paths. Furthermore, as described herein, a layer graph edge included in the selected set of candidate paths can correspond to a combination of frequency slot and communication link. Another, overlapping layer graph edge may correspond the same communication link and a different, overlapping frequency slot. The layer graphs can be updated to remove such overlapping layer graph edges.

Consistent with disclosed embodiments, the network management system can be configured to determine whether the candidate paths in a set of candidate paths remain valid. For example, the network management system can determine that a candidate path is no longer valid because the candidate path includes a layer graph edge removed from the updated layer graphs.

Consistent with disclosed embodiments, the network management system can be configured to update the sets of candidate paths that include invalid candidate paths. In some embodiments, the network management system can determine replacement paths for the invalid candidate paths. In some embodiments, the network management system can determine replacements for the sets of candidate paths that contains the invalid candidate paths. For example, when the set of candidate paths includes two disjoint exclusive paths (e.g., when the associated demand has a 1+1 protection type) and one of the two disjoint exclusive paths is invalid, the network management system can be configured to determine a replacement for the invalid candidate path or both candidate paths. The network management system can determine replacement paths as described herein with respect to step 940.

In some instances, the network management system may be unable to identify a replacement for an invalid candidate path. For example, updates to the layer graphs may disconnect the source layer graph vertices for a demand from the terminal layer graph vertices for the demand. In some embodiments, process 900 can proceed to step 999 when the network management system cannot identify a replacement for an invalid candidate path. In some embodiments, process 900 can proceed to step 999 when each remaining set of candidate paths includes at least one invalid candidate path and the management system cannot identify replacements for the invalid candidate path(s) in any remaining set of candidate paths.

In some embodiments, prior to proceeding to step 999, the network management system can re-attempt to identify replacement paths. In such embodiments, the network management system can re-attempt to identify replacement paths after relaxing constraints associated with the demand or associating the demand with a new transceiver. For example, the network management system can relax mandatory constraints associated with the demand, such as transceiver constraints, route constraints, protection types, or the like. The network management system can then attempt to determine a replacement set of candidate paths using the relaxed constraints. As an additional example, the network management system can associate the demand with a new transceiver, generate layer graphs for the demand based on the association with the new transceiver, and then determine a replacement set of candidate paths using the new layer graphs.

In various embodiments, when the network management system is unable to identify a replacement for an invalid candidate path for a demand, the network management system can re-attempt to identify replacement paths for the demand, all remaining selected demands, all selected demands, all remaining demands, all demands on the communication network, or the like. Accordingly, the network management system can relax constraints or associate with new transceivers the demand, all remaining selected demands, all selected demands, all remaining demands, all demands on the communication network, or the like.

Consistent with disclosed embodiments, process 900 can return to step 950 after updating the layer graphs and the sets of candidate paths when the candidate paths (or replacement candidate paths) included in an updated set of candidate paths are valid. Upon returning to step 950, the network management system can select among sets of candidate paths including only valid candidate paths.

In step 999, process 900 can terminate. In some embodiments, multiple iterations of process 900 can be performed. For example, when candidate paths are identified for the selected demands, the set of demands can be updated to remove the selected demands. Another iteration of process 900 can then be performed with the updated set of demands and updated layer graphs. The updated layer graphs can reflect the inclusion of candidate paths for the selected demands in the set of determined paths. In this manner, in each iteration, the network management system can determine candidate paths for the remaining demands associated with frequency slots having the widest remaining frequency slot widths. In some embodiments, iterations of process 900 can be performed until candidate paths have been determined for all the demands. In some embodiments, iterations of process 900 can be performed until a candidate path cannot be identified for a demand. In some embodiments, iterations of process 900 can be performed until a candidate path cannot be identified for all remaining demands.

In some embodiments, the network management system can terminate the process 900 when no path can be identified for a demand (or when no path can be identified for a demand following one or more changes of transceivers and/or relaxations of constraints).

In some embodiments, the network management system can avoid assigning the same resources (e.g., node, communication links, SRLGs) for multiple demands. The network management system can be configured to penalize candidate paths for different demands that correspond to routes including the same communication nodes, shared risk link groups, or communication links.

In some embodiments, the network management system can penalize such candidate paths in selecting among sets of candidate paths for demands. For example, the network management system can update selection scores for sets of candidate paths based on the candidate paths in the set of determined paths. For example, once a candidate path is included in the set of determined candidate paths, selection scores can be incremented for remaining sets of candidate paths that include correspond to routes including the same communication nodes, shared risk link groups, or communication links.

In some embodiments, the network management system can penalize identification of such candidate paths. For example, once a candidate path is generated (e.g., in step 940) that corresponds to a route including certain communication nodes, shared risk link groups, or communication links, the network management system can increment layer graph edge scores for layer graph edges corresponding to those communication links, corresponding to communication links connecting to those communication nodes, or corresponding to communication links included in those SRLGs. The network management system can then generate paths using these incremented layer graph edge scores.

In some embodiments, the network management system can penalize selection of such candidate paths from among sets of potential candidate paths for a demand. For example, when determining potential candidate paths, the network management system can include, as optional constraints, exclusion of resources (e.g., node, communication links, SRLGs) used by other candidate paths. As described herein, the network management system may then select such sets of candidate paths for the demand.

Figure 10:
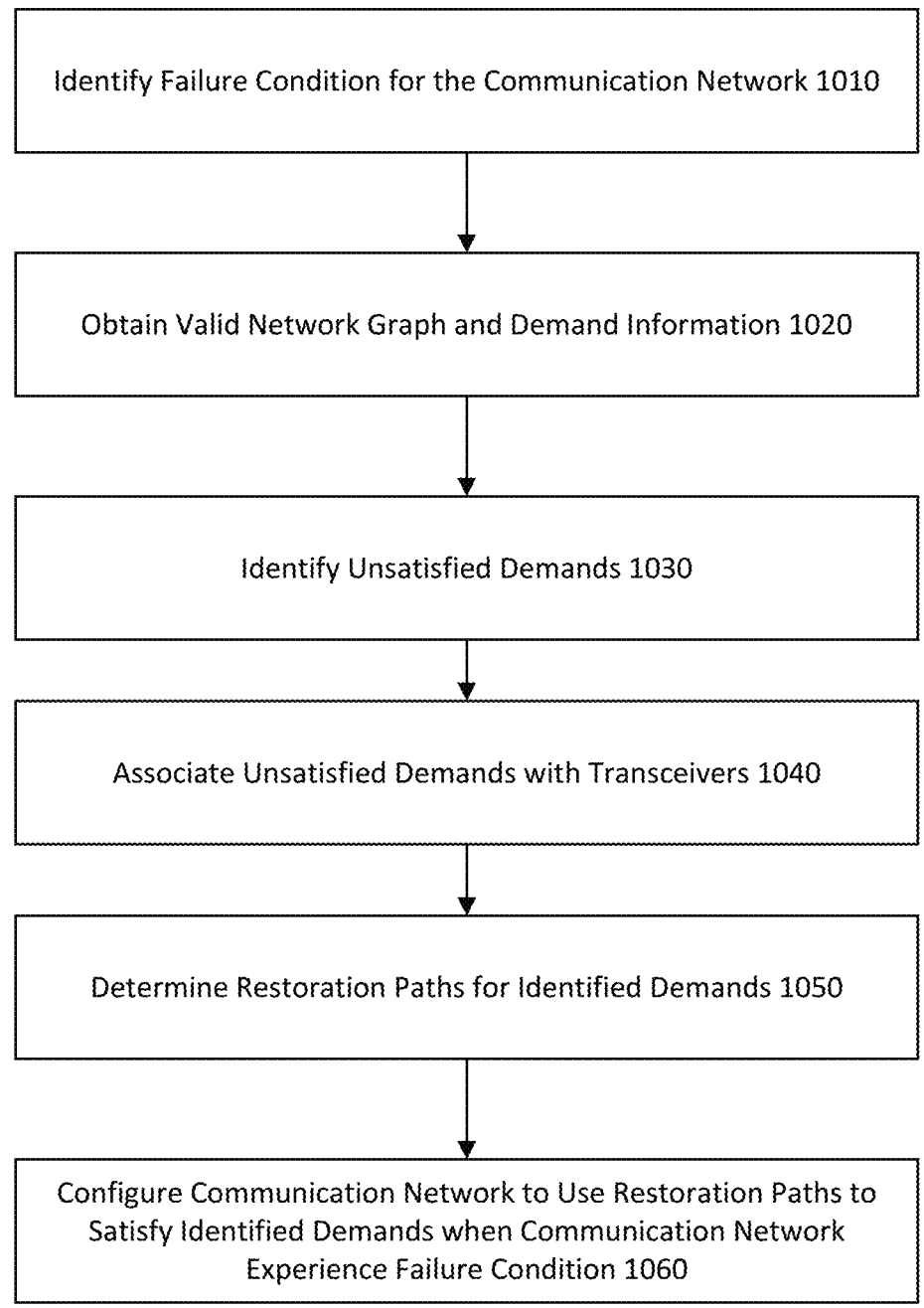
FIG. 10 depicts an exemplary process for configuring a communications network to use restoration paths to satisfy demands when the communications network experiences a failure condition, consistent with disclosed embodiments.

FIG. 10 depicts an exemplary process 1000 for configuring a communications network (e.g., communication network 160, or the like) to use restoration paths to satisfy demands when the communications network experiences a failure condition, consistent with disclosed embodiments. For convenience of description, exemplary process 1000 is described herein as being performed by a network management system (e.g., network management system 150, or the like). However, the disclosed embodiments are not so limited. In some embodiments, exemplary process 1000 can be performed by another component of the communications network (e.g., one or more of nodes 120, or the like), or another system.

Exemplary process 1000 can be performed as a one-time activity. For example, exemplary process 1000 can be performed upon initialization of a network node, sub-network, or communication network. Exemplary process 1000 can be performed according to a schedule (e.g., hourly, daily, multiple times per day or week, monthly, or the like) or in response to an event. The event can concern the demands on the communication network, the status of the communication network, receipt of an instruction or command, or the like. A change in the demands on the communication network can include a change in the set of demands on the communication network (e.g., addition or removal of a demand) or in characteristics of one or more of the demands (e.g., change in volume, OSNR requirements, or the like). A change in the status of the communication network can include the addition or remove of a node, a communication link connecting two nodes, or a combination of a communication link and a frequency slot (or transceiver, or portion of a frequency spectrum). For example, addition of a new node connected to the rest of the communication network through one or more communication links can trigger performance of process 1000. Similarly, the failure of a transceiver on a communication link, resulting in the inability to use frequency slots corresponding to that transceiver on that communication link, can trigger performance of process 1000. An instruction or command can expressly or implicitly request performance of process 1000 (e.g., from a user of the communication network, an administrator of the communication network, or the like), or the like.

In some embodiments, the network management system can identify restoration paths prior to occurrence of a failure condition on the communication network. In some embodiments, the communication network can be configured to automatically respond to a failure condition prior to the occurrence of the failure condition. Accordingly, in some embodiments, the network management system can identify an exclusive path and recovery paths for a demand on a network graph corresponding to the communication network. The network management system can then configure the communication network to implement an exclusive route corresponding to the exclusive path. The network management system can further configure the communication system to automatically implement a recovery route corresponding to the appropriate recovery path in response to a failure condition. In some embodiments, the network management system can identify an exclusive path and recovery paths, provide instructions to configure the communication network to implement the exclusive route, and only in response to the failure condition configure the communication network to implement a suitable recovery route. In some embodiments, the network management system can identify an exclusive path, provide instructions to configure the communication network to implement the exclusive route, and only in response to the failure condition identify a suitable recovery path and configure the communication network to implement a corresponding recovery route.

In step 1010 of process 1000, the network management system can identify a failure condition for the communication network, consistent with disclosed embodiments. The failure condition can be (or encompass) failure of a transceiver on a communication link, failure of a node, failure of a communication link, failure of an SRLG including multiple communications links, or the like. When process 1000 is performed prior to the occurrence of a failure condition on the communication network (e.g., in a planning stage), identification of a failure condition can include deeming a selection of one or more communication links or combinations of communication link and frequency slot to have failed. When process 1000 is performed in response to an occurrence of the failure condition, the network management device can identify the failure condition based on information received from the communication network (e.g., messages received from nodes of the communication network, or the like), from another component of the communication system (e.g., an updated communication network topology received from a database of the communication system, or the like), or from another source (e.g., another system, a user, or the like).

In step 1020 of process 1000, the network management system can obtain a valid network graph, consistent with disclosed embodiments. The valid network graph can correspond to the operational communication network (e.g., the portions of the overall communication network that remain operational) and can include vertices corresponding to operational nodes in the communication network and edges corresponding to operational communication links in the communication network, similar to the network graph described with regards to step 810 of process 800. The edges can be associated with available, operational frequency slots. The union of the available, operational frequency slots for each edge can form an overall set of available, operational frequency slots.

In step 1020 of process 1000, the network management system can further obtain demand information concerning the demands specified for the communication network. The demand information can specify the route of the demand on the communication network (or the path of the demand on the network graph or layer graph(s)). In some embodiments, the network management system can generate the demand information (e.g., through performance of process 800 or process 900, or the like). In some embodiments, the network management system can receive or retrieve the demand information from another component of the communication system, or another system.

When process 1000 is performed prior to the occurrence of a failure condition on the communication network (e.g., in a planning stage), the valid network graph can be determined based on the identified failure condition. For example, the network management system can select a communication link included in a planned exclusive route for a demand. The network management system can specify—as the failure condition—that an SRLG including the selected communication link has failed, and then determine the valid network graph based on the original network graph and this failure condition.

When process 1000 is performed in response to the occurrence of a failure condition, the network management system can obtain the network graph in a manner similar to the manner in which the network graph is obtained in step 810 of process 800. In some embodiments, obtaining the network graph can include obtaining a network graph of the operational communication network, or obtaining network information specifying the topology of the operational communication network.

In step 1030 of process 1000, the network management system can identify unsatisfied demands, consistent with disclosed embodiments. The network management system can identify the unsatisfied demands using the valid network graph and the demand information. In some embodiments, the network management system can identify network graph edges (or combinations of network graph edges and frequency slots) included in an exclusive path of a demand but absent from the valid network graph (e.g., an invalid exclusive path). Such demands can be identified as unsatisfied demands.

In step 1040 of process 1000, the network management system can associate unsatisfied demands with transceivers, consistent with disclosed embodiments. In some embodiments, the network management system can associate an unsatisfied demand including an invalid exclusive path with the transceiver used by the invalid exclusive path (e.g., the network management system can reuse the existing association between the demand and a transceiver). In some embodiments, the network management system can determine the association based on demand characteristics and transceiver characteristics, similar to the association described herein with regards to process 800. As described herein, transceivers can be associated with frequency slot widths. The unsatisfied demands can therefore be associated with frequency slot widths.

In step 1050 of process 1000, the network management system can determine sets of restoration paths for the identified unsatisfied demands, consistent with disclosed embodiments. Similar to step 830 of process 800, the network management system can iteratively determine sets of restoration paths for selected subsets of the unsatisfied demands. In some embodiments, the network management system can select unsatisfied demands based on frequency slot widths. In some embodiments, the network management system can select a frequency slot width and then select the unsatisfied demands associated with frequency slots having the selected frequency slot width. In some embodiments, the network management system can select progressively narrower frequency slot widths. In some embodiments, the network management system can select in a first iteration the widest frequency slot width among the frequency slots associated with the unsatisfied demands (or with all demands, or with the communication network).

In some embodiments, the network management system can obtain sets of layer graphs corresponding to the unsatisfied demands. In some embodiments, the network management system can obtain a set of layer graphs for each unsatisfied demand. In some embodiments, when a layer graph corresponding to a frequency slot includes an invalid exclusive path of unsatisfied demand, the set of layer graphs may include a layer graph corresponding to the frequency slot. In some embodiments, the set of layer graphs may include additional layer graphs corresponding to other frequency slots.

In some embodiments, a set of layer graphs for an unsatisfied demand can include layer graph edges corresponding to available combinations of operational network graph edges and operational frequency slots. As may be appreciated, layer graph edges included in existing exclusive paths may not be available. However, in some embodiments, the set of layer graphs can further include valid layer graph edges included in the exclusive path for the unsatisfied demand. Accordingly, the set of layer graphs for an unsatisfied demand can include layer graph edges included in the invalid exclusive path(s) of the unsatisfied demand but can exclude layer graph edges included in the exclusive paths for other unsatisfied demands.

Consistent with disclosed embodiments, the network management system can identify sets of restoration paths for the unsatisfied demands using the sets of layer graphs. In some embodiments, the network management system can search the layer graphs to identify a set of candidate restoration paths connecting a source layer graph vertex to a terminal layer graph vertex.

In some embodiments, the network management system can search each layer graph separately. In some embodiments, the network management system can generate a combined layer graph using the set of layer graphs. The combined layer graph can include constructed edges (and optionally regeneration edges). The network management system can then search the combined layer graph.

In some embodiments, the network management system can generate multiple sets of candidate restoration paths for an unsatisfied demand according to multiple sets of constraints, similar to the generation of multiple sets of candidate paths described above with regards to process 800. In some embodiments, the sets of constraints can be the same sets of constraints used to generate the candidate paths. In some embodiments, the network management system can then select among the multiple sets of candidate restoration paths for the unsatisfied demand using a constraint selection criterion, similar to the selection among such sets of candidate paths described above with regards to process 800. Alternatively, the network management system can generate a single set of candidate restoration paths for the demand.

Consistent with disclosed embodiments, the network management system can select among multiple sets of candidate restoration paths for multiple unsatisfied demands. In some embodiments, the network management system can select among the sets according to a candidate selection criterion, similar to the selection of multiple sets of candidate paths described above with regards to process 800. The selected set of candidate restoration paths can be added to a set of determined candidate restoration paths.

In some embodiments, the candidate selection criterion used to select among the sets of candidate restoration paths for multiple demands can differ from any constraint selection criterion used to select among sets of candidate restoration paths for a single demand generated using differing sets of constraints and/or from any score function used to generate the candidate restoration paths.

In some embodiments, the network management system can avoid assigning the same resources (e.g., node, communication links, SRLGs) to implement recovery routes for multiple demands.

Consistent with disclosed embodiments, the unsatisfied demands and valid network graph can be updated in response to selection of the set of candidate restoration paths. The unsatisfied demands can be updated to remove the unsatisfied demand corresponding to the selected set of candidate restoration paths. The valid network graph can be updated to reflect the selection of the set of candidate restoration paths. In some embodiments, combinations of frequency slots and network graph edges corresponding to layer graph edges included in the selected set of candidate restoration paths can be identified as unavailable. In some embodiments, combinations of frequency slots and network graph edges corresponding to layer graph edges used in the invalid exclusive path(s), but not the corresponding candidate restoration path(s), can be identified as available. Accordingly, for this failure condition, restoration paths for other unsatisfied demands may not include layer graph edges included in the candidate restoration path(s). Such restoration paths can include layer graph edges previously included in the invalid exclusive path(s), but not the corresponding candidate restoration path(s). As may be appreciated, identification of restoration paths under another, different failure condition may not be affected by restoration paths identified under this failure condition.

Consistent with disclosed embodiments, the other sets of candidate restoration paths can be updated. The selected set of candidate restoration paths can be removed from the sets of candidate restoration paths. Furthermore, candidate restoration paths can become invalid due to the updated valid network graph. The network management system can identify and determine replacements for such invalid candidate restoration paths, similar to the identification of replacements for candidate paths described in step 830 of process 800.

In some embodiments, when the network management system cannot identify a replacement for an invalid candidate restoration path, process 1000 can terminate. In some embodiments, when the network management system cannot identify a replacement for an invalid candidate path, process 1000 can return to step 1040. In some embodiments, a new transceiver can be determined for the unsatisfied demand associated with the invalid candidate restoration path. A new set of candidate restoration paths can then be determined for this unsatisfied demand in step 1050. In some embodiments, new transceivers can be determined for the unsatisfied demands lacking candidate restoration paths in the set of determined candidate restoration paths. New sets of candidate restoration paths can then be determined for these demands in step 1050. In some embodiments, new transceivers can be determined for all unsatisfied demands. New sets of candidate restoration paths can then be determined for all unsatisfied demands in step 1050.

In step 1060, the network management system can configure the communication network to use restoration routes implementing the determined candidate restoration paths for the unsatisfied demands, consistent with disclosed embodiments. In some embodiments, the network management system can provide instructions to other components of the communication network (e.g., nodes 120, database 170, or the like). In some embodiments, the instructions can be received or retrieved by the node(s) of the communication network from the network management system or another component of the communication network (e.g., database 170, another node of the communication network). When processed by the components, the instructions can cause the components to (e.g., collectively) implement the selected restoration routes for the unsatisfied demands.

In some embodiments, process 1000 can be performed repeatedly. For example, when process 1000 is performed in a planning stage, the network management system can iterate through potential failure conditions of the communication network. For example, the network management system can identify the communication links used by the routes on the network (or the SRLGs containing such communication links) and iterate through failures of each of these communication links (or SRLGs), or failures of multiple or these communication links (or SRLGs). In each iteration, the network management system can identify the unsatisfied demands for the identified failure condition and determine restoration paths for the unsatisfied demands.

Figure 11:
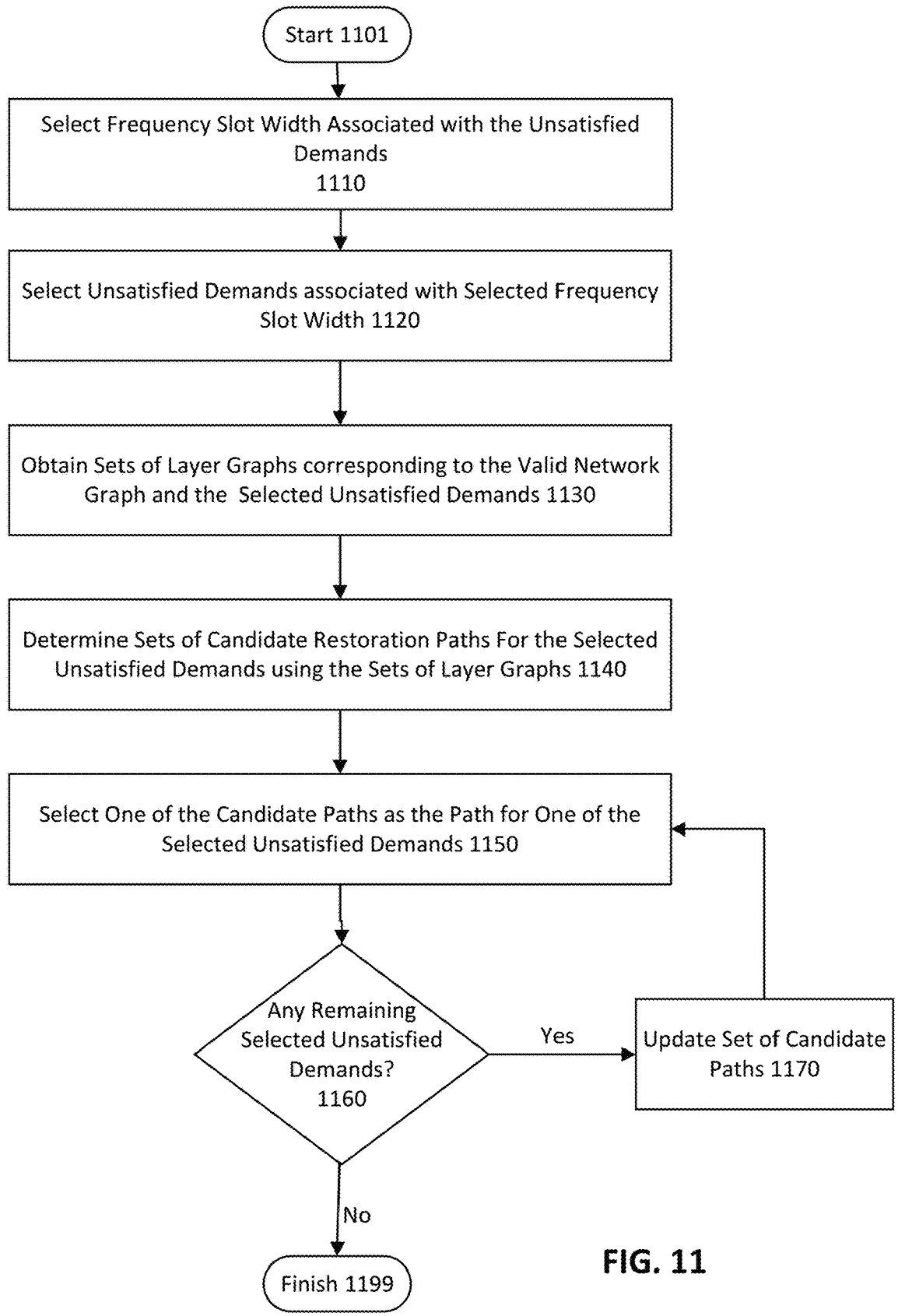
FIG. 11 depicts an exemplary process for generating and selecting among candidate restoration paths for demands having source and terminal nodes on the communication network, consistent with disclosed embodiments.

FIG. 11 depicts an exemplary process 1100 for generating and selecting among candidate restoration paths for demands having source and terminal nodes on the communication network (e.g., communication network 160, or the like), consistent with disclosed embodiments. For convenience of explanation, process 1100 is described as being performed by a network management system of a communication system (e.g., management system 150 of communication system 100). However, the disclosed embodiments are not so limited. Consistent with disclosed embodiments, process 1100 can be performed at least in part by another component of the communication system, or another system.

In step 1101, process 1100 can start. In some embodiments, process 1100 can be performed as part of another process. For example, process 1100 can be performed as part of process 1100 in step 1050 (or the like). Alternatively, process 1100 can be performed separately from process 1000.

Consistent with disclosed embodiments, process 1100 can be associated with a failure condition on the communication network. The network management system can obtain a valid network graph representing the status of the communication network following the failure condition. The valid network graph can be associated with operational frequency slots.

In some embodiments, the operational frequency slots can include the frequency slots useable on the operational communication links of the communication network. In some embodiments, the frequency slots can include frequency slots associated with the unsatisfied demands. For example, as described herein, an unsatisfied demand can be associated with a transceiver. The transceiver can be associated with a frequency slot or set of frequency slots. The frequency slot or set of frequency slots can therefore be associated with the unsatisfied demand. In some embodiments, the network management system can obtain constraints associated with the unsatisfied demands. Such constraints can include mandatory constraints and optional constraints, as described herein.

The network management system can obtain demand information concerning the unsatisfied demands. In some embodiments, the demand information for an unsatisfied demand can specify the route of the demand on the communication network (or the path of the demand on the network graph). In some embodiments, the demand information can specify the partial route of the demand on the operational communication network (or the path of the demand on the valid network graph). For example, the demand information can indicate the path of the unsatisfied demand on the valid network graph, excluding the failed network edge/frequency slot combination(s). In some embodiments, the network management system can generate the demand information (e.g., through performance of process 800 or process 900, or the like). In some embodiments, the network management system can receive or retrieve the demand information from another component of the communication system, or another system.

In step 1110 of process 1100, the network management system can select a frequency slot width, consistent with disclosed embodiments. In some embodiments, the network management system can select the frequency slot width based on the widths of the obtained frequency slots. For example, the selected frequency slot width can be the widest of the frequency slot widths.

In step 1120 of process 1100, the network management system can select unsatisfied demands associated with the selected frequency slot width, consistent with disclosed embodiments. A frequency slot or set of frequency slots can be associated with an unsatisfied demand. In some embodiments, when the frequency slot has the selected frequency slot width (or the set of frequency slots includes a frequency slot having the selected frequency slot width), the network management system can select the unsatisfied demand. When the network management system selects the widest frequency slot width in step 1110, for example, the network management system can select the unsatisfied demands associated with frequency slots having the widest frequency slot width.

In step 1130 of process 900, the network management system can obtain sets of layer graphs, consistent with disclosed embodiments. The sets of layer graphs can correspond to the unsatisfied demands. In some embodiments, the network management system can obtain a set of layer graphs for each unsatisfied demand. As described herein, a set of layer graphs for an unsatisfied demand can include layer graph edges included in the invalid exclusive path(s) of the unsatisfied demand but can exclude layer graph edges included in the exclusive paths for other unsatisfied demands.

In some embodiments, when a layer graph corresponding to a frequency slot includes an invalid exclusive path of unsatisfied demand, the network management system can use a layer graph corresponding to the same frequency slot to determine a set of restoration paths for the unsatisfied demand. In this manner, the network management system can restrict the exclusive path and the restoration path(s) to the same frequency slot. In some embodiments, the network management system may initially search the layer graph corresponding to the same frequency slot. If suitable restoration path(s) cannot be found in the layer graph, the network management system may search layer graphs corresponding to other frequency slots.

In some embodiments, when a layer graph corresponding to a frequency slot includes an invalid exclusive path of the unsatisfied demand, the network management system can penalize use of a layer graph corresponding to a frequency slot differing from the frequency slot corresponding to the layer graph that includes the invalid exclusive path. For example, the network management system can generate and search multiple layer graphs for sets of candidate restoration paths. But the network management system can select among the sets of candidate restoration paths using a selection criterion that favors sets of candidate restoration paths that include restoration path(s) in a particular layer graph (e.g., the layer graph corresponding to a frequency slot that corresponds to a layer graph that includes the invalid exclusive path). In this manner, the exclusive path and the restoration path(s) may have the same frequency slot, unless using another frequency slot for the restoration path(s) is sufficiently advantageous, according to the selection criterion.

In some embodiments, a set of layer graphs may include multiple layer graphs and the network management system may not penalize the use of a layer graph due to the layer graph corresponding to a frequency slot differing from the frequency slot corresponding to the layer graph that includes the invalid exclusive path.

In step 1140 of process 1100, the network management system can determine sets of candidate restoration paths, consistent with disclosed embodiments. The network management system can determine the sets of candidate paths using the sets of layer graphs obtained in step 1130. Similar to the determination of a candidate path, as described herein with respect to step 940 of process 900, the disclosed embodiments are not limited to any particular method of determining a candidate restoration path. Likewise, a candidate restoration path can be associated with a path score, which can depend on the scores of the layer graph edges (and/or vertices) included in the candidate path. The disclosed embodiments are not limited to any particular method of determining the scores of the edges (and/or vertices). The path score can additionally depend on the layer graph containing the path (or multiple layer graphs if the path includes a regeneration edge).

In some embodiments, the network management system can search each layer graph separately. In some embodiments, the network management system can generate a combined layer graph using the set of layer graphs. The combined layer graph can include constructed edges (and optionally regeneration edges). The network management system can then search the combined layer graph.

In some embodiments, the network management system can determine multiple sets of potential candidate restoration paths for a unsatisfied demand. Similar to the determination of multiple sets of potential candidate paths for a demand, as described with regards to step 940 of process 900, the sets of potential candidate restoration paths can be determined subject to varying sets of constraints, which can be increasingly restrictive.

In some embodiments, the network management system can determine selection scores for the sets of potential candidate restoration paths. The determination of the selection scores for the sets of potential candidate restoration paths can be similar to the determination of selection scores for sets of potential candidate paths, as described with regards to step 940 of process 900.

In some embodiments, the network management system can select among the sets of potential candidate restoration paths based on the selection scores. The selection among the sets of potential candidate restoration paths can be similar to the selection among the sets of potential candidate paths, as described with regards to step 940 of process 900.

In step 1150 of process 1100, the network management system can select among the sets of candidate restoration paths, consistent with disclosed embodiments. The network management system can select among the sets of candidate restoration paths based on the selection scores associated with each set of candidate restoration paths. Accordingly, in some embodiments, the network management system can first select sets of candidate restoration paths for unsatisfied demands from sets of potential candidate restoration paths for the unsatisfied demands. The network management system can then select a particular set of candidate restoration paths for a particular unsatisfied demand from among the sets of candidate restoration paths for the unsatisfied demands.

Consistent with disclosed embodiments, the network management system can include the selected set of candidate restoration paths set in a set of determined restoration paths. The network management system can update the selected unsatisfied demands to indicate that a solution has been determined for the particular demand (e.g., by removing the particular unsatisfied demand from the selected unsatisfied demands, or through another suitable method).

In some embodiments, the network management system can avoid assigned the same resources (e.g., node, communication links, SRLGs) to satisfy multiple demands. Candidate restoration paths for different unsatisfied demands that correspond to routes including the same communication nodes, shared risk link groups, or communication links can be penalized, similar to the penalization of candidate paths for different demands that correspond to routes including the same communication nodes, shared risk link groups, or communication links as described above with regards to process 900.

In step 1160 of process 1100, the network management system can determine whether any remaining unsatisfied demands in the set of selected unsatisfied demands lack corresponding paths in the set of determined restoration paths, consistent with disclosed embodiments. When such unsatisfied demands remain, process 1100 can proceed to step 1170. Otherwise, process 1100 can proceed to step 1199.

In step 1170 of process 1100, the network management system can update the layer graphs, consistent with disclosed embodiments. The layer graphs can be updated to remove layer graph edges included in the selected set of candidate restoration paths. The layer graphs can also be updated to remove overlapping layer graph edges. Furthermore, the layer graphs can be updated to add layer graph edges 1) included in the invalid exclusive path(s) of the unsatisfied demand corresponding to the selected set of candidate restoration paths, and 2) excluded from the selected set of candidate restoration paths.

Consistent with disclosed embodiments, the network management system can be configured to update the sets of candidate restoration paths based on the updated layer graphs. In some instances, the network management system can determine that a candidate restoration path for an unsatisfied demand is no longer valid because the candidate restoration path includes a layer graph edge removed from the updated set of layer graphs for the unsatisfied demand.

In some embodiments, the network management system can be configured to update the sets of candidate restoration paths that include invalid candidate restoration paths. In some embodiments, the network management system can determine replacement restoration paths for the invalid candidate restoration paths. In some embodiments, the network management system can determine replacements for the sets of candidate restoration paths that contains the invalid candidate restoration paths. For example, when the set of candidate restoration paths includes two disjoint restoration paths and one of the two disjoint restoration paths is invalid, the network management system can be configured to determine a replacement for the invalid candidate restoration path or both candidate restoration paths. The network management system can determine replacement restoration paths as described herein with respect to step 1140.

In some instances, the network management system may be unable to identify a replacement for an invalid candidate restoration path. For example, updates to the set of layer graphs for an unsatisfied demand may disconnect the source layer graph vertices for the unsatisfied demand from the terminal layer graph vertices for the demand. In some embodiments, process 1100 can proceed to step 1199 when the network management system cannot identify a replacement for an invalid candidate restoration path. In some embodiments, process 1100 can proceed to step 1199 when each remaining set of candidate restoration paths includes at least one invalid candidate restoration path and the management system cannot identify replacements for the invalid candidate restoration path(s) in any remaining set of candidate restoration paths.

In some embodiments, prior to proceeding to step 1199, the network management system can re-attempt to identify replacement restoration paths. The attempted re-identification of the replacement restoration paths can be performed similarly to the attempted re-identification of the replacement paths described in step 970.

In various embodiments, when the network management system is unable to identify a replacement for an invalid candidate restoration path for an unsatisfied demand, the network management system can re-attempt to identify replacement restoration paths for the unsatisfied demand, all remaining selected unsatisfied demands, all selected unsatisfied demands, all remaining unsatisfied demands, all demands on the communication network, or the like. Accordingly, the network management system can relax constraints or associate with new transceivers the unsatisfied demand, all remaining selected unsatisfied demands, all selected unsatisfied demands, all remaining unsatisfied demands, all demands on the communication network, or the like.

Consistent with disclosed embodiments, process 1100 can return to step 1150 after updating the layer graphs for the remaining unsatisfied demands and the sets of candidate restoration paths when the candidate restoration paths (or replacement candidate restoration paths) included in an updated set of candidate restoration paths are valid. Upon returning to step 1150, the network management system can select among sets of candidate restoration paths including only valid candidate restoration paths.

In step 1199, process 1100 can terminate. In some embodiments, multiple iterations of process 1100 can be performed. For example, when candidate restoration paths are identified for the selected unsatisfied demands, the set of unsatisfied demands can be updated to remove the selected unsatisfied demands. Another iteration of process 1100 can then be performed with the updated set of unsatisfied demands and updated layer graphs. The updated layer graphs can reflect the inclusion of candidate restoration paths for the selected unsatisfied demands in the set of determined restoration paths. In this manner, in each iteration, the network management system can determine candidate restoration paths for the remaining unsatisfied demands associated with frequency slots having the widest remaining frequency slot widths. In some embodiments, iterations of process 1100 can be performed until candidate restoration paths have been determined for all the unsatisfied demands. In some embodiments, iterations of process 1100 can be performed until a candidate restoration path cannot be identified for an unsatisfied demand. In some embodiments, iterations of process 1100 can be performed until a candidate restoration path cannot be identified for all remaining unsatisfied demands.

In some embodiments, the network management system can terminate the process 1100 when no restoration path can be identified for an unsatisfied demand (or when no restoration path can be identified for an unsatisfied demand following one or more changes of transceivers and/or relaxations of constraints).

As described herein, process 1100 can be associated with a failure condition on the communication network. In some embodiments, in a planning phase, the network management system can iteratively perform process 1100 for different failure conditions. As may be appreciated, different failure conditions can have different sets of unsatisfied demands and different valid network graphs. In some embodiments, the network management system can perform process 1100 within a double loop (or semantically equivalent structure). One loop can correspond to different failure conditions. Another loop can correspond to different frequency slot widths. In this manner, restoration paths can be identified using process 1100 for different failure conditions on a communication network.

The disclosed embodiments may further be described using the following clauses:

1. A method for configuring a communication network associated with a set of frequency slots, comprising: obtaining a network graph corresponding to the communication network, the network graph including: network graph vertices corresponding to nodes of the communication network; network graph edges corresponding to links of the communication network, each network graph edge associated with an available subset of the set of frequency slots; obtaining demands having source and terminal nodes on the communication network; selecting, from among the obtained demands, demands associated with a frequency slot width; obtaining layer graphs corresponding to a first subset of the set of frequency slots of the selected frequency slot width, a first layer graph of the layer graphs corresponding to a first frequency slot of the first subset and including: layer graph edges corresponding to the network graph edges that include, in the available subsets, the first frequency slot; and layer graph vertices corresponding to the network graph vertices connected by the network graph edges that include, in the available subsets, the first frequency slot; determining, using the layer graphs, sets of paths for the selected demands on the communication network, determination of a first set of paths for a first demand of the selected demands comprising: determining sets of candidate paths for the selected demands, each set of candidate paths for the first demand including a candidate path connecting a first layer source vertex of the layer graphs to a first layer terminal vertex of the layer graphs, the first layer source vertex corresponding to a first source node of the communication network for the first demand and the first layer terminal vertex corresponding to a first terminal node of the communication network for the first demand; and selecting a first set of candidate paths of the sets of candidate paths as the first set of paths for the first demand; and configuring the communication network to satisfy the selected demands using the determined sets of paths for the selected demands.

2. The method of clause 1, wherein: determining paths for the selected demands on the communication network, further comprises: constructing, for a first one of the selected demands, a connected layer graph including constructed edges connecting either: layer source vertices corresponding to a source node of the communication network for the first one of the selected demands, or terminal vertices corresponding to a terminal node of the communication network for the first one of the selected demands; and determining sets of candidate paths for the selected demands comprises searching, for the first one of the selected demands, the connected layer graph for the set of candidate paths for the first one of the selected demands.

3. The method of clause 2, wherein: the connected layer graph is searched for the set of candidate paths for the first one of the selected demands using path finding algorithms, shortest path algorithms, flow algorithms, minimal-cost flow algorithms, multi-constrained optimal path algorithms.

4. The method of any one of clauses 2 to 3, wherein: the connected layer graph further includes a regeneration edge connecting two layer graph vertices corresponding to a regeneration node of the communication network, the regeneration node being neither a source node nor a terminal node of the first demand.

5. The method of any one of clauses 1 to 4, wherein: the determination of the first set of paths for the first demand further comprises: determining a selection value for each set of candidate paths; and the first set of candidate paths is selected based on the selection scores for the sets of candidate paths.

6. The method of clause 5, wherein: the selection value for the first set of candidate paths depends on: a signal to noise ratio of at least one layer graph edge included in the first set of candidate paths; a physical path length of at least one layer graph edge included in the first set of candidate paths; a cost of at least one layer graph edge included in the first set of candidate paths; a number of layer graph edges included in the first set of candidate paths; a frequency slot associated with the first set of candidate paths; or a number of frequency slots in the set of frequency slots affected by the selection of the first set of candidate paths.

7. The method of claim 5, wherein: a second set of candidate paths of the sets of candidate paths is associated with a second frequency slot of the first subset; and the selection value for the second set of candidate paths depends on at least one frequency-dependent bias value associated with the second frequency slot.

8. The method of any one of clauses 1 to 7, wherein: the method further comprises: selecting a transceiver for each one of the obtained demands; and associating each one of the obtained demands with a frequency slot width of the transceiver selected for the one of the obtained demands.

9. The method of clause 8, wherein: the transceivers are selected for the obtained demands based on at least one of: line rate, optical signal to noise ratio, or a desired frequency slot width.

10. The method of any one of clauses 1 to 9, wherein: selecting demands associated with the selected frequency slot width comprises: determining a largest frequency slot width associated with the obtained demands; and selecting demands associated with the largest frequency slot width.

11. The method of any one of clauses 1 to 10, wherein: each candidate path of the set of candidate paths for the first demand satisfies a set of conditions based on at least one of length or corresponding route on the communication network, number of vertices or edges included in the candidate path, or path score.

12 The method of any one of clauses 1 to 11, wherein: the determination of the sets of candidate paths for the selected demands penalizes inclusion, in candidate paths for different demands, of: layer graph vertices corresponding to the same network vertices, or layer graph edges corresponding to network edges in the same shared risk link group.

13. The method of any one of clauses 1 to 12, wherein: the frequency slots included in
the first subset are non-overlapping.

14. The method of clause 13, wherein: the frequency slots included in the first subset are consecutive.

15. The method of any one of clauses 1 to 12, wherein: the set of frequency slots includes overlapping frequency slots.

16. The method of any one of clauses 1 to 15, wherein: each one of the set of frequency slots is associated with a central frequency and a frequency slot width.

17. A method for configuring a communication network associated with a set of frequency slots, comprising: identifying a first failure condition for the communication network; obtaining a valid network graph corresponding to the communication network when the communication network experiences the first failure condition, the valid network graph including: network graph vertices corresponding to operational nodes of the communication network when the communication network experiences the first failure condition; and network graph edges corresponding to operational links of the communication network when the communication network experiences the first failure condition, each network graph edge being associated with an available subset of the set of frequency slots; identifying demands on the communication network that are unsatisfied when the communication network experiences the first failure condition; determining sets of restoration paths for the demands, comprising: obtaining sets of layer graphs, a first set of the layer graphs corresponding to the valid network graph and a first demand of the demands; determining sets of candidate restoration paths for the demands on the sets of the layer graphs, a first set of candidate restoration paths being for the first demand and including a first candidate restoration path connecting a first layer source vertex of the first set of the layer graphs to a first layer terminal vertex of the first set of the layer graphs, the first layer source vertex corresponding to a first source node of the communication network for the first demand and the first layer terminal vertex corresponding to a first terminal node of the communication network for the first demand; and selecting the first set of candidate restoration paths as a first set of restoration paths for the first demand; and configuring the communication network to use the sets of restoration paths to satisfy the demands when the communication network experiences the first failure condition.

18. The method of clause 17, wherein: a first exclusive path for the first demand includes first exclusive path edges, each first exclusive path edge associated with a first exclusive path frequency slot of the set of frequency slots; and the first set of the layer graphs includes a first layer graph corresponding to a first layer graph frequency slot of the set of frequency slots, the first layer graph including: first layer graph edges that correspond to: network graph edges in the valid network graph that include, in the available subsets, the first layer graph frequency slot; or first exclusive path edges associated with first exclusive path frequency slots that match the first layer graph frequency slot; and first layer graph vertices corresponding to the network graph vertices connected by the network graph edges that include, in the available subsets, the first layer graph frequency slot.

19. The method of any one of clauses 17 to 18, wherein: determining the sets of restoration paths for the demands further comprises: determining a selection value for each set of candidate restoration paths; and the first set of candidate restoration paths is selected as the first set of restoration paths for the first demand based on the selection values for each of the sets of candidate restoration paths.

20. The method of any one of clauses 17 to 19, wherein: the first set of the layer graphs includes layer graph edges corresponding to available network edge and frequency slot combinations on the valid network graph, the available network edge and frequency slot combinations including a first set of exclusive network edge and frequency slot combinations for the first demand.

21. The method of any one of clauses 17 to 20, wherein: a first exclusive path for the first demand uses the first layer graph frequency slot; and first set of the layer graphs includes only the first layer graph.

22. The method of any one of clauses 17 to 21, wherein: a first exclusive path for the first demand uses a first exclusive path frequency slot; and determination of the first candidate path for the first demand penalizes use of frequency slots differing from the first exclusive path frequency slot.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A method for configuring a communication network associated with a set of frequency slots, comprising:
   obtaining a network graph corresponding to the communication network, the network graph including:
      network graph vertices corresponding to nodes of the communication network;
      network graph edges corresponding to links of the communication network, each network graph edge associated with an available subset of the set of frequency slots;
   obtaining demands having source and terminal nodes on the communication network;
   selecting, from among the obtained demands, demands associated with a frequency slot width;
   obtaining layer graphs corresponding to a first subset of the set of frequency slots of the selected frequency slot width, a first layer graph of the layer graphs corresponding to a first frequency slot of the first subset and including:
      layer graph edges corresponding to the network graph edges that include, in the available subsets, the first frequency slot; and
      layer graph vertices corresponding to the network graph vertices connected by the network graph edges that include, in the available subsets, the first frequency slot;
   determining, using the layer graphs, sets of paths for the selected demands on the communication network, determination of a first set of paths for a first demand of the selected demands comprising:
      determining sets of candidate paths for the selected demands, each set of candidate paths for the first demand including a candidate path connecting a first layer source vertex of the layer graphs to a first layer terminal vertex of the layer graphs, the first layer source vertex corresponding to a first source node of the communication network for the first demand and the first layer terminal vertex corresponding to a first terminal node of the communication network for the first demand; and
      selecting a first set of candidate paths of the sets of candidate paths as the first set of paths for the first demand; and
   configuring the communication network to satisfy the selected demands using the determined sets of paths for the selected demands.

2. The method of claim 1, wherein:
   the method further comprises:
      selecting a transceiver for each one of the obtained demands; and
      associating each one of the obtained demands with a frequency slot width of the transceiver selected for the one of the obtained demands.

3. The method of claim 2, wherein:
the transceivers are selected for the obtained demands based on at least one of:
line rate,
optical signal to noise ratio, or
a desired frequency slot width.

4. The method of claim 1, wherein:
selecting demands associated with the selected frequency slot width comprises:
determining a largest frequency slot width associated with the obtained demands; and
selecting demands associated with the largest frequency slot width.

5. The method of claim 1, wherein:
the frequency slots included in the first subset are non-overlapping.

6. The method of claim 5, wherein:
the frequency slots included in the first subset are consecutive.

7. The method of claim 1, wherein:
each candidate path of the set of candidate paths for the first demand satisfies a set of conditions based on at least one of length or corresponding route on the communication network, number of vertices or edges included in the candidate path, or path score.

8. The method of claim 1, wherein:
the determination of the sets of candidate paths for the selected demands penalizes inclusion, in candidate paths for different demands, of:
layer graph vertices corresponding to the same network vertices, or
layer graph edges corresponding to network edges in the same shared risk link group.

9. The method of claim 1, wherein:
determining paths for the selected demands on the communication network, further comprises:
constructing, for a first one of the selected demands, a connected layer graph including constructed edges connecting either:
layer source vertices corresponding to a source node of the communication network for the first one of the selected demands, or
terminal vertices corresponding to a terminal node of the communication network for the first one of the selected demands; and
determining sets of candidate paths for the selected demands comprises searching, for the first one of the selected demands, the connected layer graph for the set of candidate paths for the first one of the selected demands.

10. The method of claim 9, wherein:
the connected layer graph is searched for the set of candidate paths for the first one of the selected demands using path finding algorithms, shortest path algorithms, flow algorithms, minimal-cost flow algorithms, multi-constrained optimal path algorithms.

11. The method of claim 9, wherein:
the connected layer graph further includes a regeneration edge connecting two layer graph vertices corresponding to a regeneration node of the communication network, the regeneration node being neither a source node nor a terminal node of the first demand.

12. The method of claim 1, wherein:
the determination of the first set of paths for the first demand further comprises:
determining a selection value for each set of candidate paths; and
the first set of candidate paths is selected based on the selection scores for the sets of candidate paths.

13. The method of claim 12, wherein:
the selection value for the first set of candidate paths depends on:
a signal to noise ratio of at least one layer graph edge included in the first set of candidate paths;
a physical path length of at least one layer graph edge included in the first set of candidate paths;
a cost of at least one layer graph edge included in the first set of candidate paths;
a number of layer graph edges included in the first set of candidate paths;
a frequency slot associated with the first set of candidate paths; or
a number of frequency slots in the set of frequency slots affected by the selection of the first set of candidate paths.

14. The method of claim 12, wherein:
a second set of candidate paths of the sets of candidate paths is associated with a second frequency slot of the first subset; and
the selection value for the second set of candidate paths depends on at least one frequency-dependent bias value associated with the second frequency slot.

15. The method of claim 1, wherein:
each one of the set of frequency slots is associated with a central frequency and a frequency slot width.

16. The method of claim 1, wherein:
the set of frequency slots includes overlapping frequency slots.

17. A method for configuring a communication network associated with a set of frequency slots, comprising:
identifying a first failure condition for the communication network;
obtaining a valid network graph corresponding to the communication network when the communication network experiences the first failure condition, the valid network graph including:
network graph vertices corresponding to operational nodes of the communication network when the communication network experiences the first failure condition; and
network graph edges corresponding to operational links of the communication network when the communication network experiences the first failure condition, each network graph edge being associated with an available subset of the set of frequency slots;
identifying demands on the communication network that are unsatisfied when the communication network experiences the first failure condition;
determining sets of restoration paths for the demands, comprising:
obtaining sets of layer graphs, a first set of the layer graphs corresponding to the valid network graph and a first demand of the demands;
determining sets of candidate restoration paths for the demands on the sets of the layer graphs, a first set of candidate restoration paths being for the first demand and including a first candidate restoration path connecting a first layer source vertex of the first set of the layer graphs to a first layer terminal vertex of the first set of the layer graphs, the first layer source vertex corresponding to a first source node of the communication network for the first demand and the first layer terminal vertex corresponding to a first terminal node of the communication network for the first demand; and selecting the first set of candidate restoration paths as a first set of restoration paths for the first demand; and configuring the communication network to use the sets of restoration paths to satisfy the demands when the communication network experiences the first failure condition.

18. The method of claim 17, wherein:

a first exclusive path for the first demand includes first exclusive path edges, each first exclusive path edge associated with a first exclusive path frequency slot of the set of frequency slots; and the first set of the layer graphs includes a first layer graph corresponding to a first layer graph frequency slot of the set of frequency slots, the first layer graph including:

first layer graph edges that correspond to:
network graph edges in the valid network graph that include, in the available subsets, the first layer graph frequency slot; or
first exclusive path edges associated with first exclusive path frequency slots that match the first layer graph frequency slot; and first layer graph vertices corresponding to the network graph vertices connected by the network graph edges that include, in the available subsets, the first layer graph frequency slot.

19. The method of claim 17, wherein:

the first set of the layer graphs includes layer graph edges corresponding to available network edge and frequency slot combinations on the valid network graph, the available network edge and frequency slot combinations including a first set of exclusive network edge and frequency slot combinations for the first demand.

20. The method of claim 17, wherein:

a first exclusive path for the first demand uses the first layer graph frequency slot; and first set of the layer graphs includes only the first layer graph.

21. The method of claim 17, wherein:

a first exclusive path for the first demand uses a first exclusive path frequency slot; and determination of the first candidate path for the first demand penalizes use of frequency slots differing from the first exclusive path frequency slot.

22. The method of claim 17, wherein:

determining the sets of restoration paths for the demands further comprises:

determining a selection value for each set of candidate restoration paths; and the first set of candidate restoration paths is selected as the first set of restoration paths for the first demand based on the selection values for each of the sets of candidate restoration paths.

\* \* \* \* \*